United States Patent [19]

Shires

[11] Patent Number: 5,521,724

[45] Date of Patent: May 28, 1996

[54] REAL-TIME AUTOMULTISCOPIC 3D VIDEO DISPLAY USING HOLOGRAPHIC OPTICAL ELEMENTS (HOES)

[76] Inventor: Mark R. Shires, 107 E. Fairmount Ave., Milwaukee, Wis. 53217

[21] Appl. No.: 225,916

[22] Filed: Apr. 11, 1994

Related U.S. Application Data

[63] Continuation-in-part of Ser. No. 151,950, Nov. 15, 1993, abandoned.

[51] Int. Cl.⁶ .............................. G02B 5/32; G03H 1/26
[52] U.S. Cl. ............................... 359/22; 359/15; 359/23; 359/25
[58] Field of Search .................................. 359/22, 23, 24, 359/25, 26, 15

[56] References Cited

U.S. PATENT DOCUMENTS

| | | | |
|---|---|---|---|
| 3,765,741 | 10/1973 | Kimura et al. | 359/23 |
| 4,130,337 | 12/1978 | Okoshi | 359/23 |
| 4,500,163 | 2/1985 | Burns et al. | 350/3.7 |
| 4,520,387 | 5/1985 | Cortellini | 358/90 |
| 4,669,812 | 6/1987 | Hoebing | 359/25 |
| 4,799,739 | 1/1989 | Newswanger | 350/3.7 |
| 4,993,790 | 2/1991 | Vick | 350/3.73 |
| 5,011,244 | 4/1991 | Smith et al. | 359/22 |
| 5,111,313 | 5/1992 | Shires | 359/17 |
| 5,187,597 | 2/1993 | Kato et al. | 359/22 |
| 5,191,449 | 3/1993 | Newswanger | 359/22 |
| 5,379,133 | 1/1995 | Kirk | 359/23 |

OTHER PUBLICATIONS

SPIE Proceedings, Jul. 18–22, 1994, Fifth International Symposium on Display Holography, at Lake Forest College, Illinois, Mark Shires, "Real–Time Flat Panel Solid–state Holographic Stereogram.

"International Symposium on 3D Imaging and Holography, Nov. 7–11, 1994, Osaka, Japan (a one page flier circulated at exhibitor's booth), "Holographic 3D Video Display".

*Primary Examiner*—Martin Lerner

[57] ABSTRACT

An inexpensive electronic display that presents 3D images by binocular parallax is disclosed. The effect produced is that of a real-time holographic stereogram. The pixels of a 2D display are spatially multiplexed by two HOEs to produce a plurality of lateral viewing zones of 2D rasters, similar to the method used in lenticular screen systems. A directional screen HOE scatters incident light over a lateral viewing zone so small that typically only one eye of a viewer can occupy it at a time. A multiplexer HOE comprised of thousands of tiny holograms, each when reconstructed projects a spot onto the directional screen HOE. The sum of all these spots forms a two-dimensional raster of spots on the directional screen HOE. Each spot can be projected onto the directional screen HOE from at least two laterally different angles and thus reconstruct the directional screen HOE from at least two laterally offset angles, consequently creating at least two laterally offset viewing zones of each spot. A real-time 2D image generator is used to control the brightness of light entering or immediately after exiting each hologram or portion of each hologram of the multiplexer HOE. Varying the 2D image generated thus varies which spots are visible in each viewing zone and thus the automultiscopic (or autostereoscopic) image the viewer sees. When each view presented corresponds to a 2D perspective view of an image, the viewer perceives a 3D image.

12 Claims, 14 Drawing Sheets

REAL-TIME AUTOMULTISCOPIC 3D VIDEO DISPLAY USING HOLOGRAPHIC OPTICAL ELEMENTS (HOES)

CROSS-REFERENCE

This disclosure is related to U.S. Pat. No. 5,111,313 issued May 5, 1992 to the same inventor as in the present disclosure. This application is a continuation-in-part of Ser. No. 08/151,950 filed Nov. 15, 1993, now abandoned.

BACKGROUND OF THE INVENTION

1. Field of the Invention

This invention relates to electronic three-dimensional (3D) displays that do not require stereo-glasses, specifically to real-time autostereoscopic or automultiscopic displays.

2. Description of Prior Art

Previous real-time 3D imaging systems that do not require headgear have not been ideal for consumer applications such as 3D television, 3D video games, 3D advertising, or 3D presentations, Nor have they been ideal for many nonconsumer applications such as 3D computer imaging. Of those systems, real-time autostereoscopes that present only a left-eye view and a right-eye view are difficult to use because they need to be viewed from specific viewing locations. Prior art autostereoscopes that are capable of tracking a viewer's eyes and directing each image toward the appropriate eye solves the problem, but at the expense and complication of an added head tracking system. Yet even a head tracking autostereoscope cannot easily accommodate multiple simultaneous viewers, since multiple viewers move their heads independently of each other. The best solution is an automultiscopic display that presents many views. ("Automultiscopic" is a more general term then "autostereoscopic" as used herein. Herein, autostereoscopic displays present exactly two views, whereas automultiscopic displays present two or more views.) Automultiscopic displays typically present many views of an image, allowing observers to move freely and see new perspectives by means of horizontal, and sometimes vertical, parallax. Automultiscopes usually provide the viewer with the ability to "look around" objects by intuitively moving his head.

In the present inventor's U.S. Pat. No. 5,111,313, he describes a simple automultiscopic display. That display, however, requires a moving part and is not a flat panel display. Newswanger, in U.S. Pat. No. 4,799,739, reveals a solid state automultiscopic system. However, Newswanger's system requires several two-dimensional (2D) image projectors that must be aligned and serviced, making it bulky, complex, and costly, and thus not ideal for consumer use. Eichenlaub, in U.S. Pat. Nos. 4,367,486, 4,717, 949, and 4,829,365, describes a solid state nearly flat panel 3D automultiscopic display that requires two very fast switching light valve arrays. However, no light valve arrays are available that can switch fast enough to support the many views needed (20–40) to provide fluid and imperceptible changes in perspective as the viewer moves his head.

Lenticular screens, as in prior art FIGS. 1 and 2, have long been a popular approach to 3D imaging. In typical lenticular screen systems of the prior art, an array of long, thin cylindrical lenses 30 is placed in front of a 2D imaging surface 31. If the 2D imaging surface 31 is positioned so as to be at the focal distance of the cylindrical lenses 30, as FIG. 1 shows, a 3D image can be presented via horizontal parallax. Different sets of pixels are observable from different viewing angles, and thus the 3D image is autostereoscopic or automultiscopic. FIG. 1 illustrates how two pixels, 32 and 33, are viewable from unique viewing zones. The pixels on 2D imaging surface 31 are spatially multiplexed by lenticular screen 30. A real-time display could be made employing a lenticular sheet and a real-time 2D display such as a Liquid Crystal Display (LCD) panel. However, the LCD pixels would have to be extremely narrow (0.0025 inch or less to provide 20–40 views) in order for the images viewed to have proper picture element size and shape. The off-axis close-up view of the display in FIG. 2 shows the unusually narrow shape of pixels 32, 33, and all the other pixels on 2D imaging surface 31. Not only do these narrow pixels make alignment of the LCD display and the lenticular screen hypercritical, but the optical imperfections (such as astigmatism, spherical aberration, coma, etc.) of the simple cylindrical lenses that make up the lenticular screen become apparent.

The present disclosed invention achieves superior automultiscopic results than the aforementioned lenticular screen system by using HOEs (Holographic Optical Elements), instead of conventional lenticular screens, as discussed below in combination with the included figures.

SUMMARY OF THE INVENTION

In the present invention, two HOEs produce the same automultiscopic effect as a lenticular screen, even if the 2D display is a conventional display with conventional pixel size, shape, and configuration. The pixels and their corresponding viewing zones are spatially multiplexed by holograms on the HOEs. Additionally, optical imperfections and alignment of the HOEs with the 2D imaging surface are much less critical than with lenticular screens since the pixels on the 2D imaging surface can be much larger.

In the present invention, the display uses an HOE as a directional screen. This directional screen HOE limits the scattering of incident light to one or more viewing zones of limited lateral extent. The width or lateral extent of each viewing zone is typically so small that only one eye of a viewer can occupy the viewing zone at a time. Therefore, any spot of light projected onto the directional screen HOE from a given angle and location, is only viewable from a laterally narrow viewing zone. The lateral location of the viewing zone is determined by the lateral angle of projection of the spot of light, because, as is common with all holograms, the location of the image reconstructed by a hologram varies with the angle of incidence of the reconstructing light. Hence, projecting a spot of light onto the directional screen HOE from several different lateral angles results in the spot being observable from several different laterally offset viewing zones.

The second HOE is a multiplexer HOE that is comprised of thousands of tiny holograms. Each tiny hologram, when reconstructed, projects a spot onto the directional screen HOE. The sum of all spots projected by the holograms of the multiplexer HOE forms a two-dimensional array or raster of spots on the directional screen HOE. It is this 2D raster of spots on the directional screen HOE that the viewer sees. Each spot projected onto the directional screen HOE consequently reconstructs that small part of the directional screen HOE, and thus is viewable from the viewing zones that correspond to the angles of projection of the spot. Since every spot projected onto the directional screen HOE can be projected from at least two laterally offset angles, every spot can thus be made viewable from at least two laterally offset viewing zones. Therefore, the viewer is presented with at least two laterally offset viewing zones, each viewing zone presenting a unique 2D raster of spots. The brightness of each spot in each 2D raster can be independently controlled so as to display automultiscopic 3D images.

A 2D image generator is used to control the brightness of light entering (incident on) or after exiting each hologram, or parts of each hologram, of the multiplexer HOE. In some embodiments, a real-time 2D image generator projects 2D raster images onto the multiplexer HOE. By individually controlling the brightness of each pixel of the projected raster, the intensity of light entering (reconstructing) each hologram or portions of each hologram of the multiplexer HOE can be controlled. Alternatively, other embodiments use a light valve array or spatial light modulator (such as an LCD panel) to control the intensity of the light after exiting each hologram, or parts of each hologram, of the multiplexer HOE. Thus in all embodiments, the picture elements of a real-time 2D image generator are spatially multiplexed by two HOEs to display automultiscopic 3D images.

(It should be noted that HOEs are sometimes called DOEs, Diffractive Optical Elements. With the recent advent of binary optics and microlenses, there has been a blurring of categories between refractive and diffractive optics. Either could be used in the present invention.)

DESCRIPTION OF THE PREFERRED EMBODIMENTS

Figure 1:
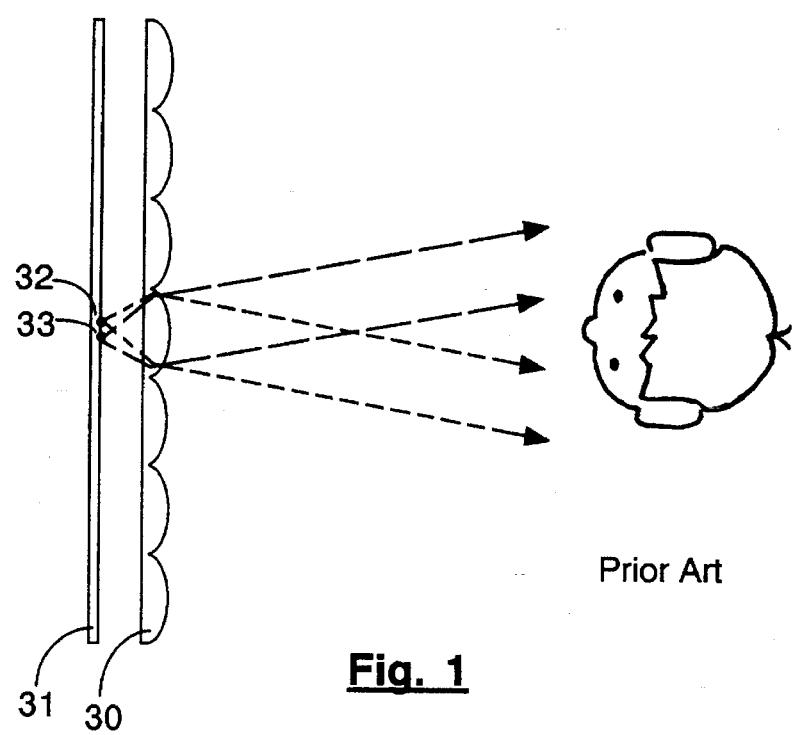
FIG. 1 is a top view of a conventional lenticular screen system of the prior art showing two light paths of two different pixels.
Figure 2:
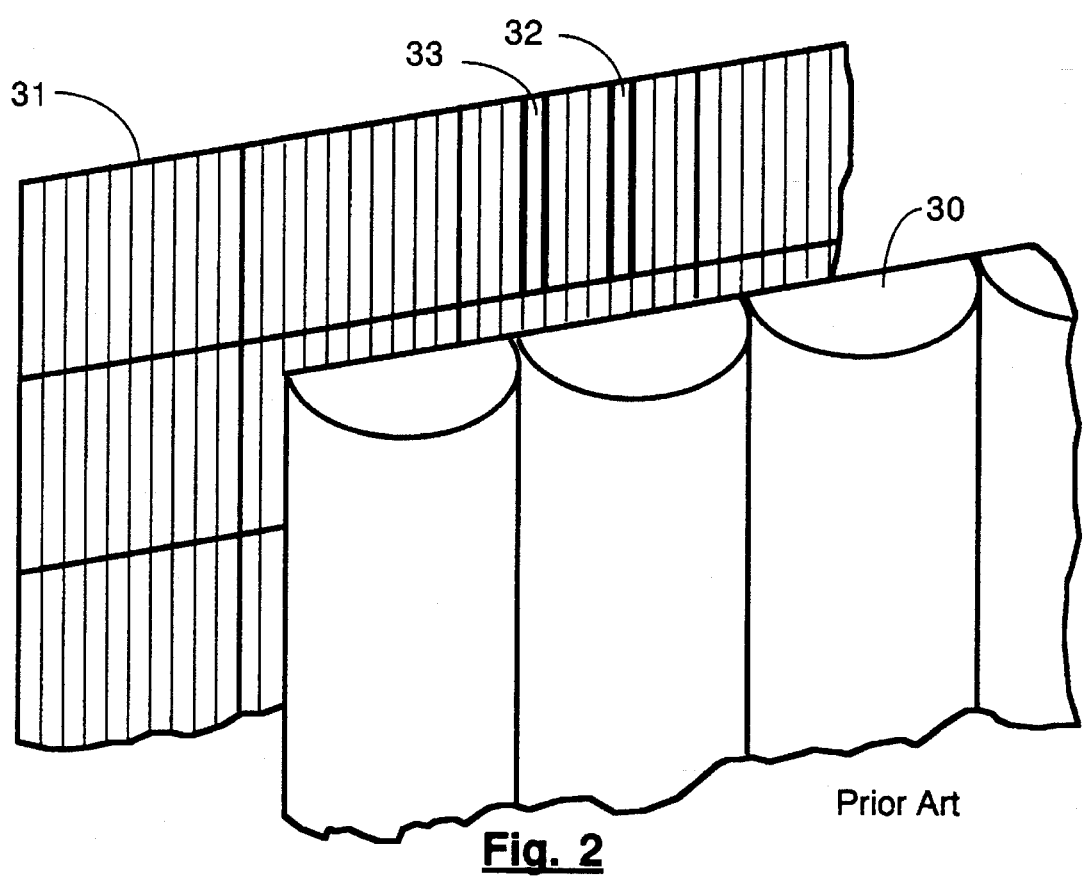
FIG. 2 is an off-axis close-up view of the lenticular screen system of FIG. 1.
Figure 3:
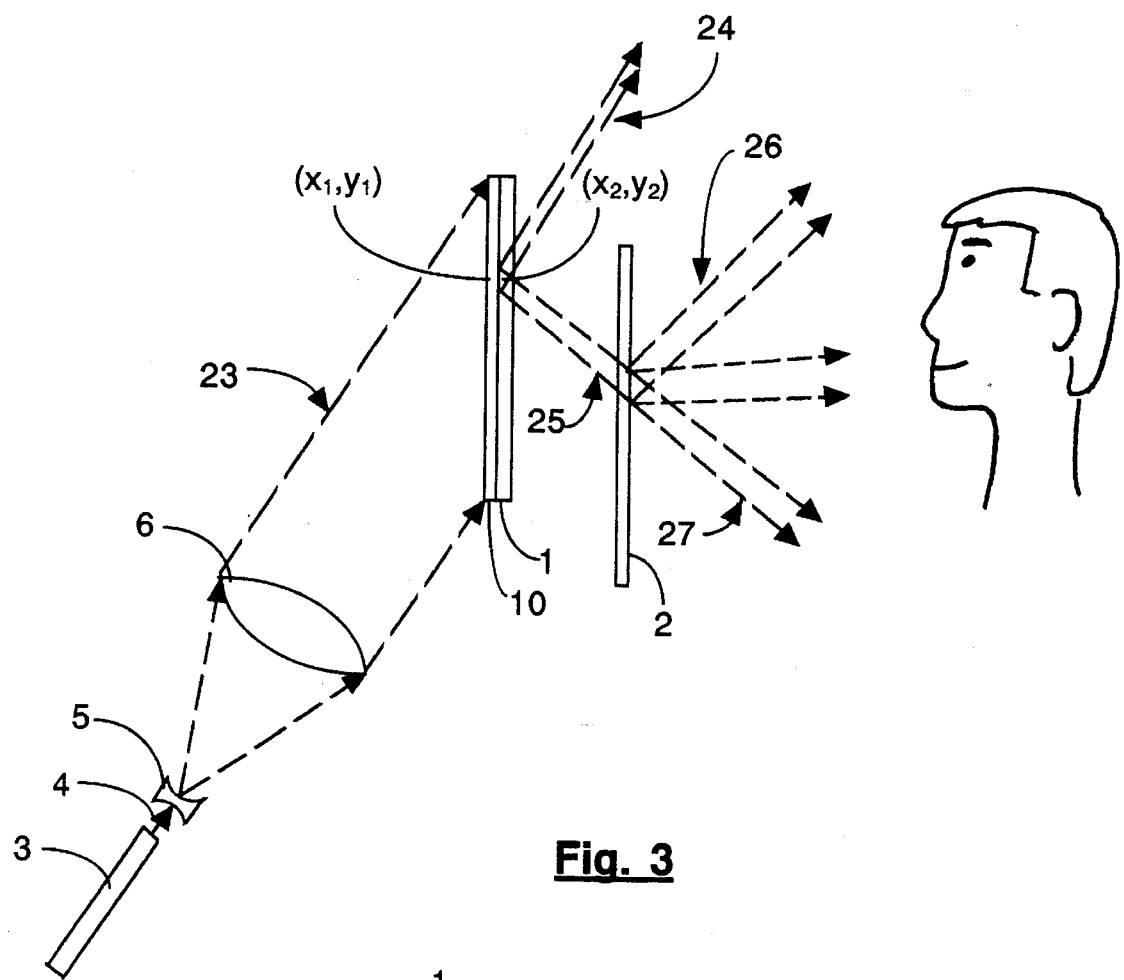
FIG. 3 is a side view of one embodiment of the real-time automultiscopic 3D video display system of the present invention employing one laser and two transmission HOEs.

FIG. 3 depicts the first preferred embodiment of the present invention. Laser 3 emits a beam of monochromatic light 4 that is expanded by lenses 5 and 6 to provide a wider collimated light beam 23 that is incident on LCD panel 10. (Other light sources with accompanying optics and filters could be used to create a monochromatic collimated beam of light.) Multiplexer HOE 1 is aligned and positioned immediately next to LCD panel 10 so that the 2D raster image produced by LCD panel 10 is projected onto multiplexer HOE 1. Multiplexer HOE 1 is comprised of a 2D array of thousands of tiny holograms, one for each pixel in LCD panel 10. Further, each hologram of multiplexer HOE 1 corresponds to the size, shape and position of each pixel in LCD panel 10. Wherever a pixel in LCD panel 10 is made transparent, light rays of beam 23 are allowed to pass through the pixel and then be incident on a hologram of multiplexer HOE 1. In this way, LCD panel 10 is able to selectively reconstruct each hologram on multiplexer HOE 1 in real-time. (Obviously, LCD panel 10 could be positioned on the opposite side of multiplexer HOE 1, in which case it would control the intensity of the beams immediately after exiting multiplexer HOE 1 instead of the intensity of the beams incident on multiplexer HOE 1 .) By way of example, FIG. 3 shows pixel $(x_1,y_1)$ of LCD panel 10 open, allowing collimated rays of light beam 23 to be incident on hologram $(x_2,y_2)$ of multiplexer HOE 1. Hologram $(x_2,y_2)$ in turn diffracts incident light beam 23 toward the directional screen HOE 2 as light beam 25, while the undiffracted (0 order) light beam 24, passes out of the range of directional screen HOE 2 (screen HOE 2 hereinafter). Diffracted light beam 25 thus illuminates a spot on screen HOE 2, which in turn diffracts part of light beam 25 to exit as light beams 26 which are diffused and visible over a large vertical extent but only over a small narrow horizontal extent. (The term "horizontal" is not used herein as strictly meaning parallel to the horizon, but rather as lateral to the viewer or the display; i.e., left or right relative to the viewer or the display.) The part of incident light beam 25 that is undiffracted by screen HOE 2 continues downward and out of sight of the viewer as light beam 27.

Figure 4:
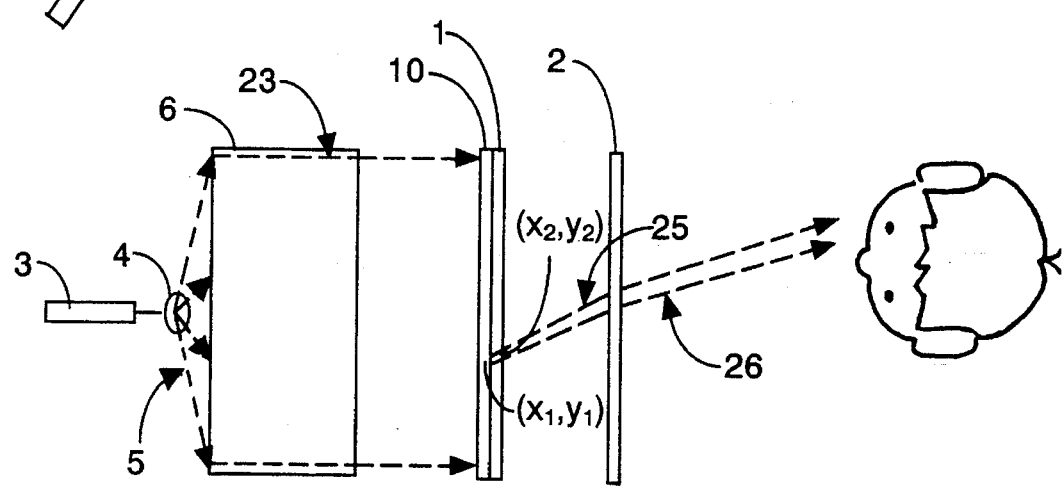
FIG. 4 is a top view of the embodiment shown in FIG. 3.

FIG. 4 is a top view of the display embodiment depicted in FIG. 3 with the same solitary pixel $(x_1,y_1)$ open on LCD panel 10. Diffracted light beams 25 and 26 are shown in this top view.

Figure 5A:
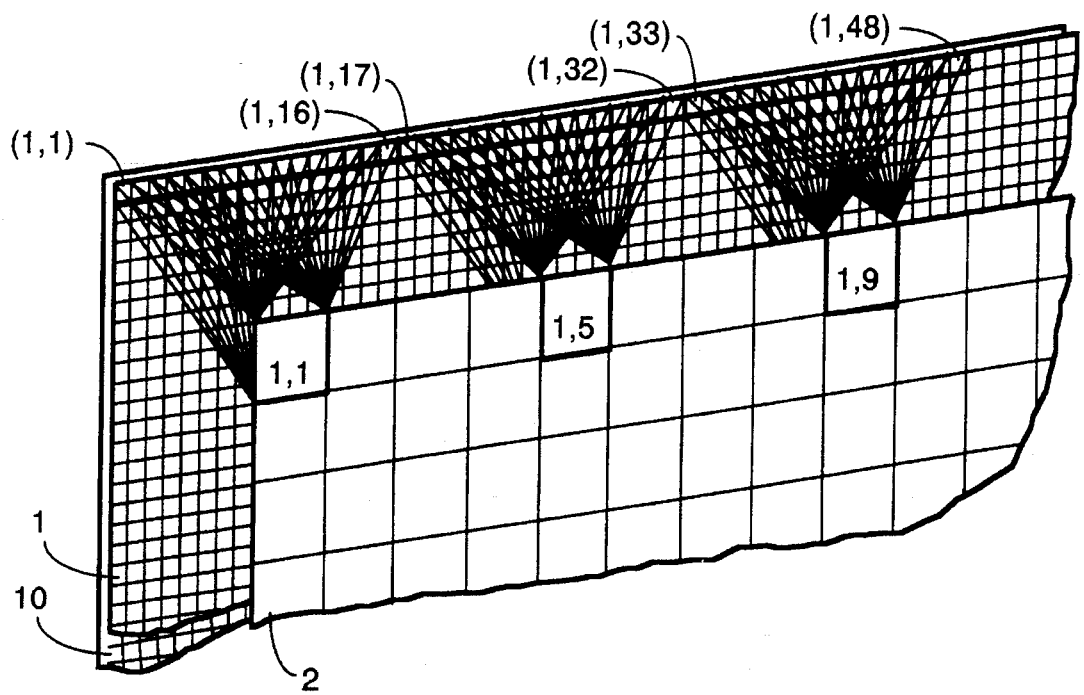
FIGS. 5a–5f are off-axis close-up views of the HOEs of FIG. 3 and 4, with each showing light beams reconstructed by different holograms of the multiplexer HOE.

FIGS. 5a through 5f are close-up views of the display of FIGS. 3 and 4. In this embodiment, the holograms of multiplexer HOE 1, when reconstructed, project a 2D array of spots onto screen HOE 2 as follows. Referring first to FIG. 5a, if pixel (1,1) on LCD panel 10 is made transparent, then hologram (1,1) on multiplexer HOE 1 is reconstructed. (The notation used here is (row, column)). When reconstructed, this hologram projects a spot (1,1) onto screen HOE 2. (When the term "spot" is used herein, it refers to the picture element projected onto screen HOE 2 that is visible to the viewer. A 2D raster of spots projected onto screen HOE 2 make up the image the viewer sees when viewing the display. The term "pixel" herein refers to a picture element of LCD screen 10. These pixels are not visible to the viewer.) The spots shown projected onto screen HOE 2 are square but they could, of course, be circular or some other shape. In this embodiment the spots projected onto screen HOE 2 are 4 times as wide and 4 times as tall as both the pixels of LCD panel 10 and the holograms of multiplexer HOE 1. Since each spot is reconstructed by 16 different holograms of multiplexer HOE 1, and since each spot is 16 times larger than each hologram of multiplexer HOE 1, the overall area of multiplexer HOE 1 is identical in size to the overall area of screen HOE 2. The 16 holograms, (1,1) through (1,16) (these are all in row 1 of multiplexer HOE 1) each reconstruct the same spot (1,1) on screen HOE 2 as FIG. 5a shows. The only difference between holograms (1,1)–(1,16) is the lateral angle from which they project spot (1,1) onto screen HOE 2. However, the light beams that produce the spot on screen HOE 2 become the reference beams that reconstruct the part of screen HOE 2 that they illuminate. Therefore the angle of projection of each spot onto screen HOE 2 determines the location of the viewing zone from which the spot may be seen.

Screen HOE 2 is a holographic equivalent of a conventional lenticular screen and is comprised of an array of transmission holograms. (While a 2D array of holograms is shown for screen HOE 2 in FIGS. 5a–f, this could be a one-dimensional array of tall and narrow holograms since there is no necessary vertical discontinuity between the holograms in each column. In fact, with some display configurations, screen HOE 2 can be one large single exposure hologram of a line image.) Screen HOE 2 is positioned in relation to multiplexer HOE 2 so that each spot produced by multiplexer HOE 1 is projected onto a corresponding hologram of screen HOE 2. For example, spot (1,1) produced by multiplexer HOE 1 is projected onto hologram (1,1) of screen HOE 2. Each hologram of screen HOE 2, when reconstructed, scatters light vertically while essentially collimating light horizontally. In other words, each hologram of screen HOE 2, when reconstructed with a horizontally diverging reference beam emanating from the multiplexer HOE 1, produces a vertical line image. The line image is a real image located on the viewer's side of screen HOE 2. The light beams that form this line image (beams 26 in FIGS. 3 and 4) define a single lateral viewing zone. Projecting the spot onto screen HOE 2 from a location that is horizontally offset from the original reference beam angle causes the spot to be viewable from a horizontally offset viewing zone. Projecting the spot from a contiguous horizontal array of locations creates several contiguous lateral viewing zones of the spot. By selectively controlling the states of pixels (1,1) through (1,16) of LCD panel 10, one can control the brightness of spot (1,1) on screen HOE 2 for each of sixteen laterally adjacent viewing zones. Thus spot (1,1) on screen HOE 2 can be automultiscopically controlled in real time.

The next 16 holograms in row 1 of multiplexer HOE 1, (1,17)–(1,32), when reconstructed each project spot (1,5) onto screen HOE 2. Holograms (1,33)–(1,48) of multiplexer HOE 1 project spot (1,9) onto screen HOE 2. This pattern is repeated for the remainder of the holograms in row 1 of multiplexer HOE 1.

Figure 5B:
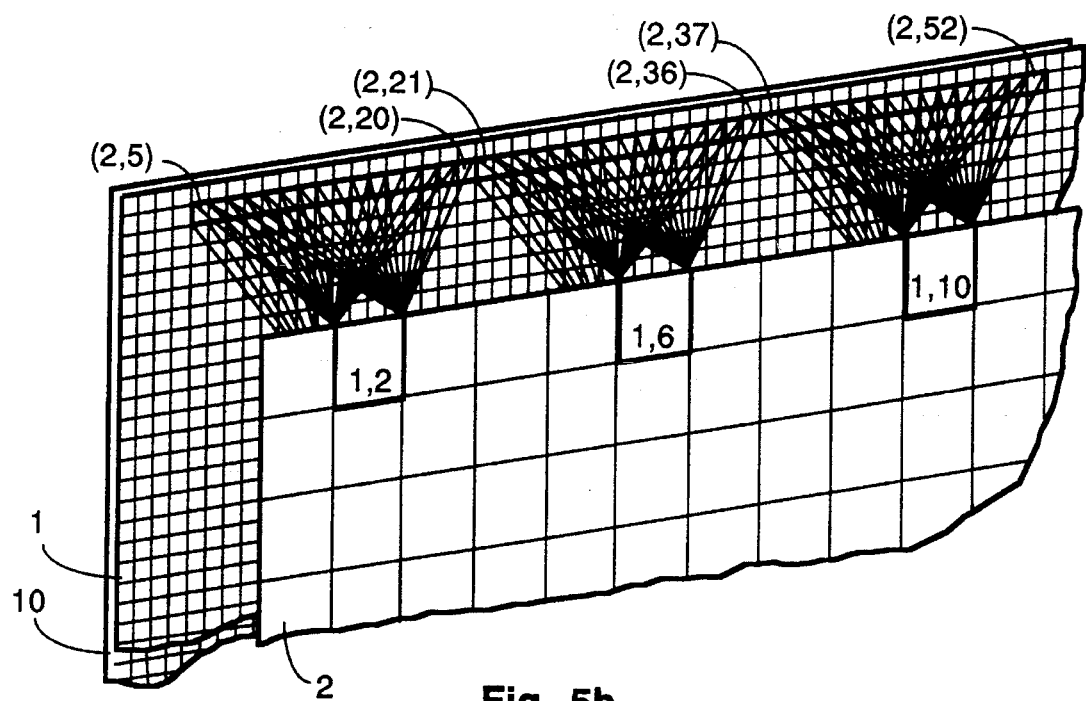

As FIG. 5b shows, row 2 of multiplexer HOE 1 is similar to row 1, except that the pattern is laterally staggered by the width of 4 holograms (which equals the width of one spot). The first 4 holograms in row 2 are unused. The next 16 holograms of multiplexer HOE 1 (2,5)–(2,20) project spot (1,2) onto screen HOE 2. Holograms (2,21)–(2,36) project spot (1,6) onto screen HOE 2. Holograms (2,37)–(2,52) project spot (1,10) onto screen HOE 2. This pattern repeats for the remainder of row 2.

Figure 5C:
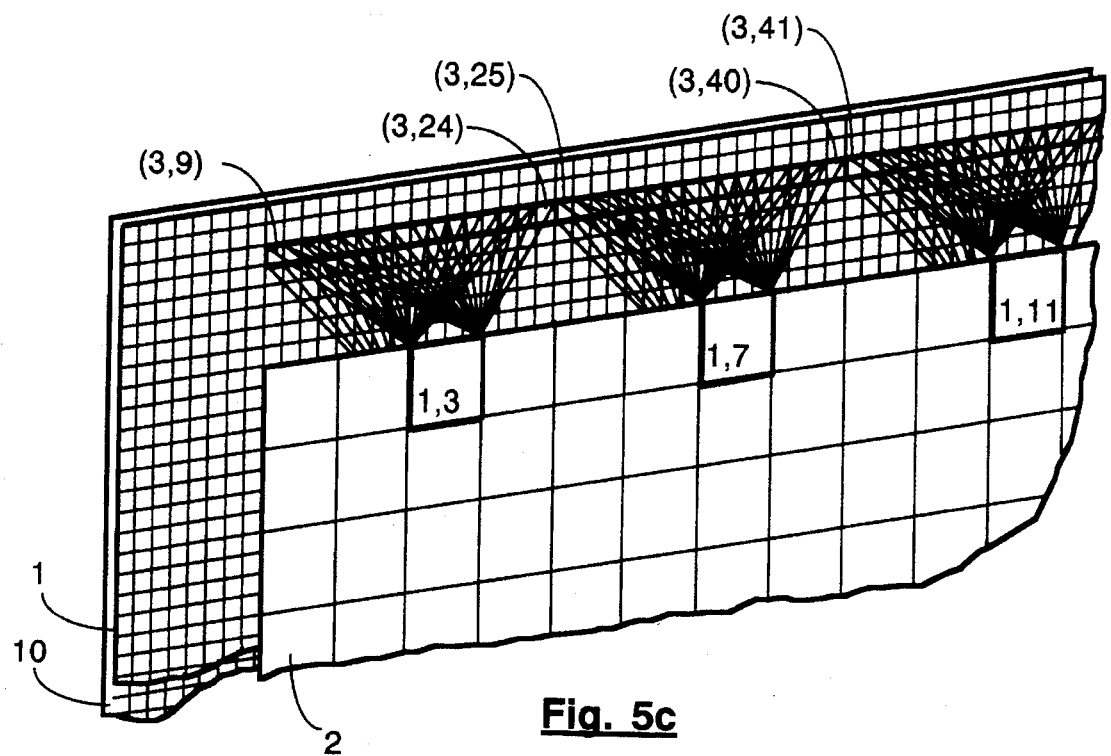

As FIG. 5c shows, the holograms in row 3 of multiplexer HOE 1 are laterally staggered by 8 holograms (which equals the width of 2 spots). Thus the first 8 holograms in row 3 are unused. The remaining holograms in row 3 of multiplexer HOE 1 when reconstructed, project the spots as shown.

Figure 5D:
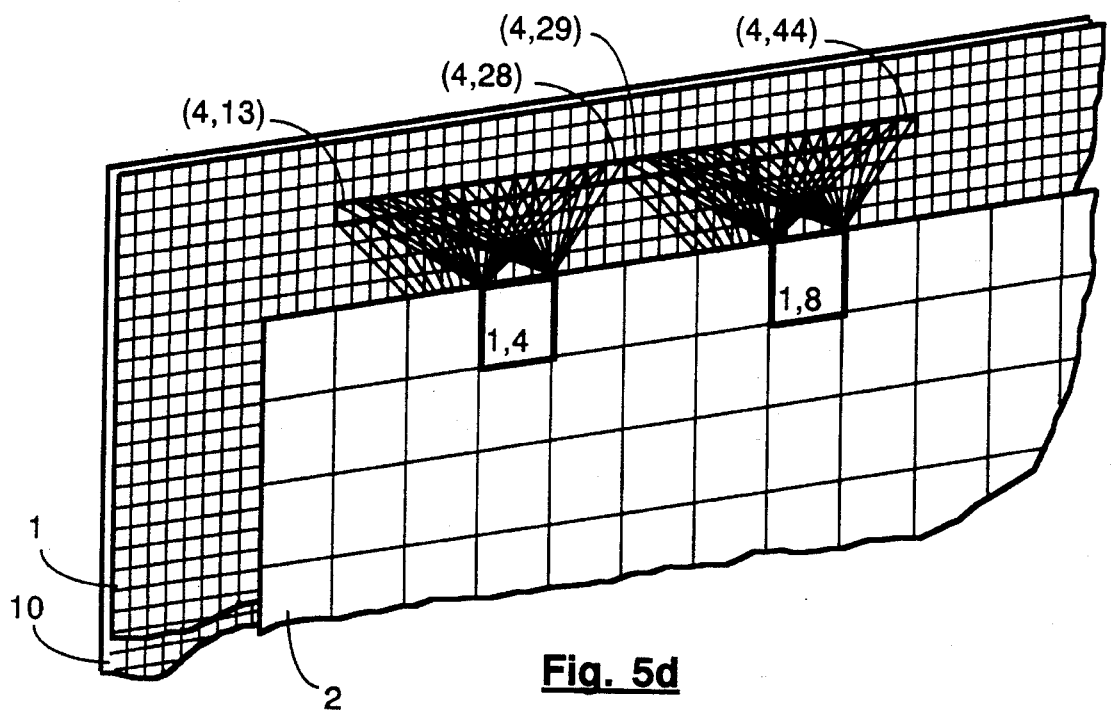

As FIG. 5d shows, the holograms in row 4 of multiplexer HOE 1 are laterally staggered by 12 holograms (which equals the width of 3 spots). The first 12 holograms in row 4 are unused. The remaining holograms in row 4 of multiplexer HOE 1, when reconstructed, project the spots as shown. Thus FIGS. 5a–5d illustrate the projection of the first row of spots onto screen HOE 2.

Figure 5E:
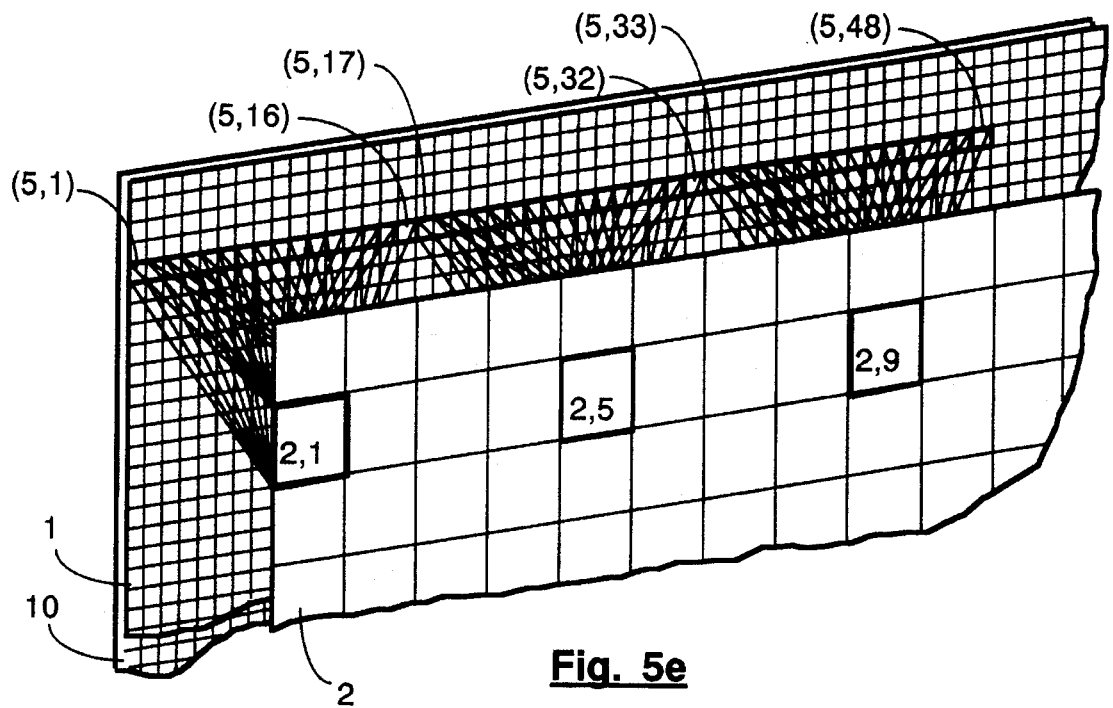

The holograms in rows 5–8 of Multiplexer HOE 1, when reconstructed, project the second row of spots onto screen HOE 2. As FIG. 5e shows, the holograms in row 5 of multiplexer HOE 1 are not laterally staggered. Holograms (5,1)–(5,16) of multiplexer HOE 1, when reconstructed, project spot (2,1) onto screen HOE 2. Holograms (5,17)–(5,32) of multiplexer HOE 1, when reconstructed, each project spot (2,5) onto screen HOE 2. Holograms (5,33)–(5,48) of multiplexer HOE 1, when reconstructed, project spot (2,9) onto screen HOE 2. This pattern is repeated for the remainder of the holograms in row 5 of multiplexer HOE 1.

Figure 5F:
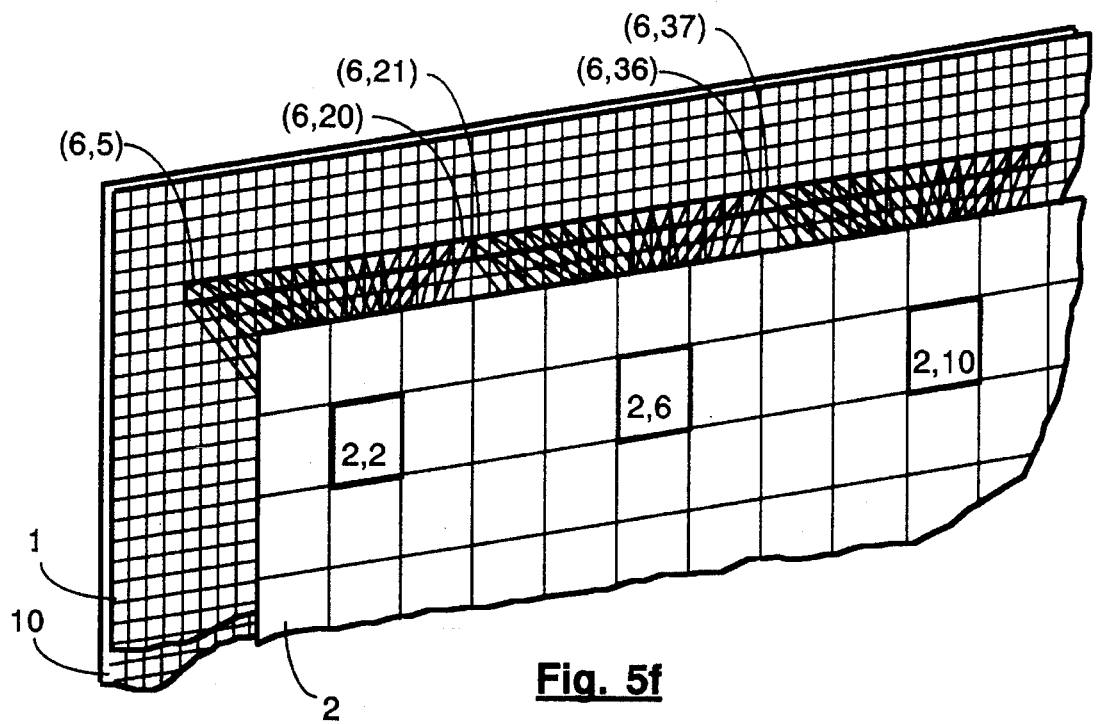

As FIG. 5f shows, the holograms in row 6 of multiplexer HOE 1 are laterally staggered by 4. The holograms in row 6 of multiplexer HOE 1, when reconstructed, project the spots as shown.

This same pattern is repeated for the remainder of the holograms of multiplexer HOE 1. The result is that every spot projected onto screen HOE 2 is potentially viewable from 16 different laterally adjacent viewing zones, depending on which holograms of multiplexer HOE 1 are reconstructed. The combination of holograms reconstructed depends on the states of the pixels in LCD panel 10 which control the intensity of light incident on the holograms of multiplexer HOE 1. Since the sum of all spots projected onto screen HOE 2 constitutes a 2D array or raster, each viewing zone is presented with a unique 2D raster of real-time controllable spots. If each 2D raster image presented corresponds to a perspective view of a scene or object from the angle which it is presented, the viewer then perceives the image as 3D. By appropriately controlling the light allowed through each pixel of LCD panel 10 in real-time, any automultiscopic 3D image can be created in real-time.

The fact that the reconstruction angle of different spots is vertically offset does not detract from the horizontal parallax effect. The only result is that the viewing zones are vertically shifted. Since the viewing zones have a large vertical extent, the vertical shifting can only be detected by an observer whose eyes occupy the extreme top or bottom of the viewing zones.

The multiplexer HOE 1 pattern described above is just one example. There are an infinite number of alternative multiplexing patterns that the multiplexer HOE can have and produce automultiscopic images. The pattern and numbers used in the previous and the following embodiments are just used by way of example, and are not limiting on the scope of the present invention. The multiplexing patterns can vary greatly and still embody this idea. For some applications, more views may be desired, whereas for other applications, fewer views may be desired. The number of views displayable can vary greatly. The ratio of hologram size on the multiplexer HOE to the size of spots projected onto the screen HOE can vary greatly too.

Figure 6:
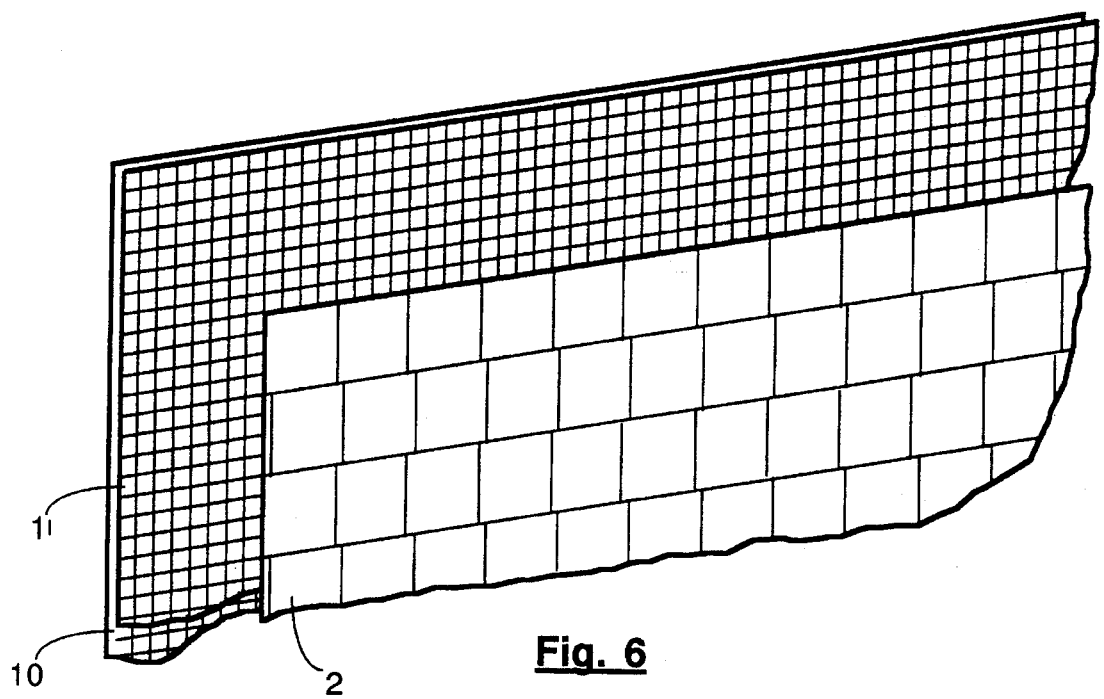
FIG. 6 is an off-axis close-up view of a second embodiment of the present invention wherein the viewing zones are interlaced.

In some embodiments the views can be interlaced to increase the automultiscopic effect and create a smoother transition as the observer moves between views. For example, each view can consist of half of a 2D raster and each view can be made to overlap 50% with its neighboring view (which consists of the complementary half of the 2D raster). FIG. 6 shows a view-interlaced embodiment of the invention. This embodiment is exactly like that shown in FIGS. 3–5, except that the holograms on multiplexer HOE $1^I$ that project the even rows of spots are made so that the spots they project onto screen HOE $2^I$ are slightly shifted horizontally by ½ the width of a hologram of multiplexer HOE $1^I$. Thus every even row of the raster of spots on screen HOE $2^I$ is slightly shifted to the right as compared to the odd rows. (Note that screen HOE $2^I$ is identical to screen HOE 2 in the previous embodiment, except that the holograms in all the even rows are shifted so as to correspond to the projection of the spots onto the even rows.) The result is that the 16 reconstruction angles of the even rows of spots are slightly different then the 16 reconstruction angles of the odd rows of spots. Consequently the display has 32 interlaced views. Odd views 1–31 consist of just odd rows of spots in the 2D raster. Even views 2–32 consist of just even rows of spots in the 2D raster. Yet since views are made to overlap 50%, each eye of the viewer will occupy two adjacent viewing zones simultaneously, and thus each eye sees a complete raster. For example, view #11 consists of all the odd rows (1,3,5,7,9, . . . ) of spots in the 2D raster. View #12 consists of all the even rows (2,4,6,8, . . . ) of spots in the 2D raster. Since view #11 and view #12 are adjacent, they overlap 50%. Therefore a viewer's eye can occupy view #11 and view #12 simultaneously, and see a complete 2D raster. If the viewer's eye moves to the right, it will move out of view #11 and into view #13 while still being in view #12. Thus the viewer's eye is presented with a new set of odd rows of spots in the 2D raster while still seeing the same set of even numbered rows of spots in the 2D raster. If the viewer moves further to the right, the eye will move out of view #12 and into view #14 while still being in view #13. Thus the viewer's eye sees a new set of even rows of spots in the 2D raster. This interlacing pattern doubles the views displayed without sacrificing 2D resolution.

Figure 7:
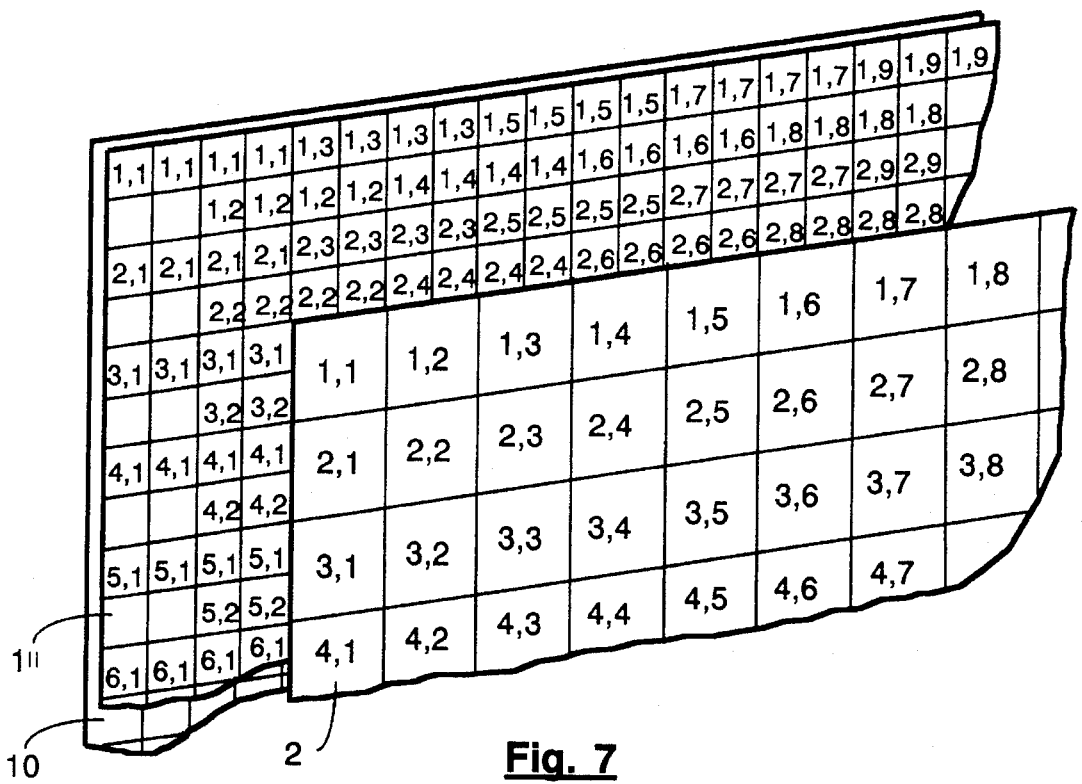
FIG. 7 is an off-axis close-up view of a third embodiment of the present invention having four noninterlaced views.

FIG. 7 shows another embodiment of the present invention. To illustrate the multiplexing pattern, the address of the spot projected onto screen HOE $2^{II}$ is written on the surface of the hologram of multiplexer HOE $1^{II}$ that reconstructs it. This embodiment is identical to the embodiment described in FIGS. 3–5 except for the multiplexing pattern of the HOEs. In this embodiment, only four noninterlaced views are presented. However, given a fixed number of pixels on LCD panel 10, the 2D raster resolution per view in this embodiment is four times greater than it is in the embodiment of FIGS. 3–5. This is because the number of views presented here is ¼ of that in the embodiment of FIGS. 3–5.

Figure 8:
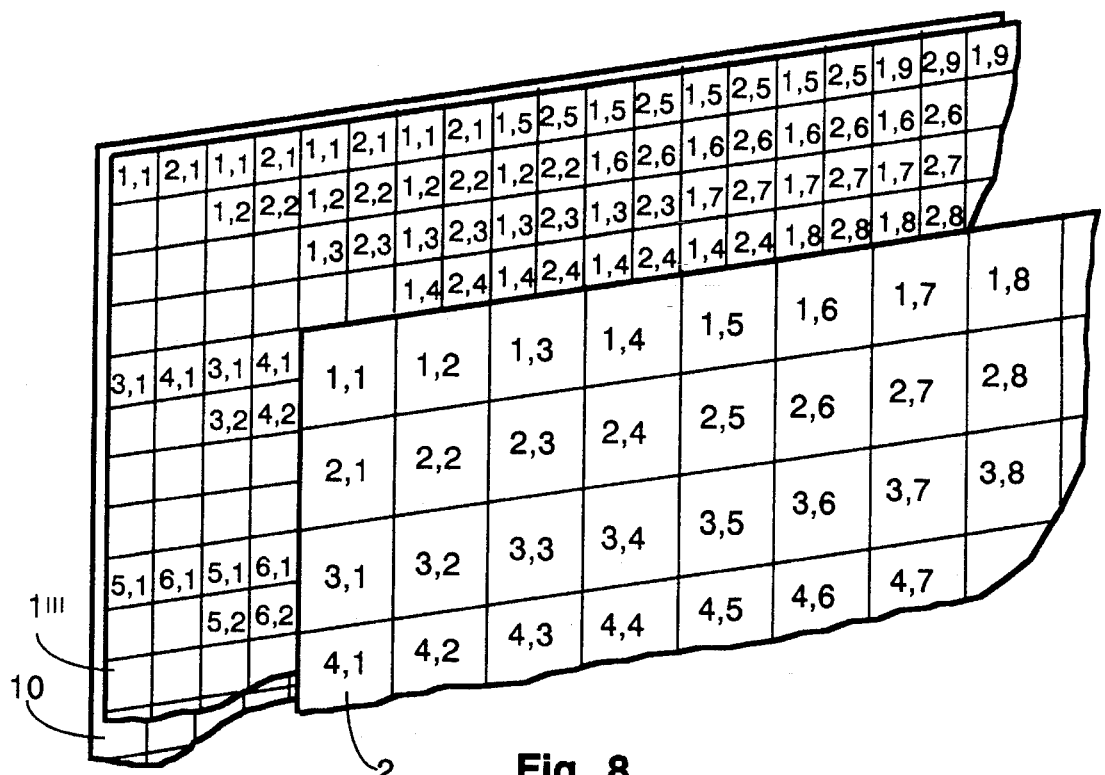
FIG. 8 is an off-axis close-up view of a fourth embodiment of the present invention wherein the viewing zones are interlaced.

FIG. 8 shows another embodiment that is identical to the embodiment shown in FIG. 7, except that the multiplexing pattern on multiplexer HOE $1^{III}$ is slightly modified so as to be view-interlaced. Unlike the embodiment shown in FIG. 6, this view-interlacing is achieved without horizontally offsetting the spots in the raster projected onto screen HOE $2^{III}$. Instead, the multiplexing pattern is such that the reconstruction angles of the odd rows of spots projected onto screen HOE $2^{III}$ are slightly different than the reconstruction angles of the even rows of spots projected onto screen HOE $2^{III}$.

Figure 9:
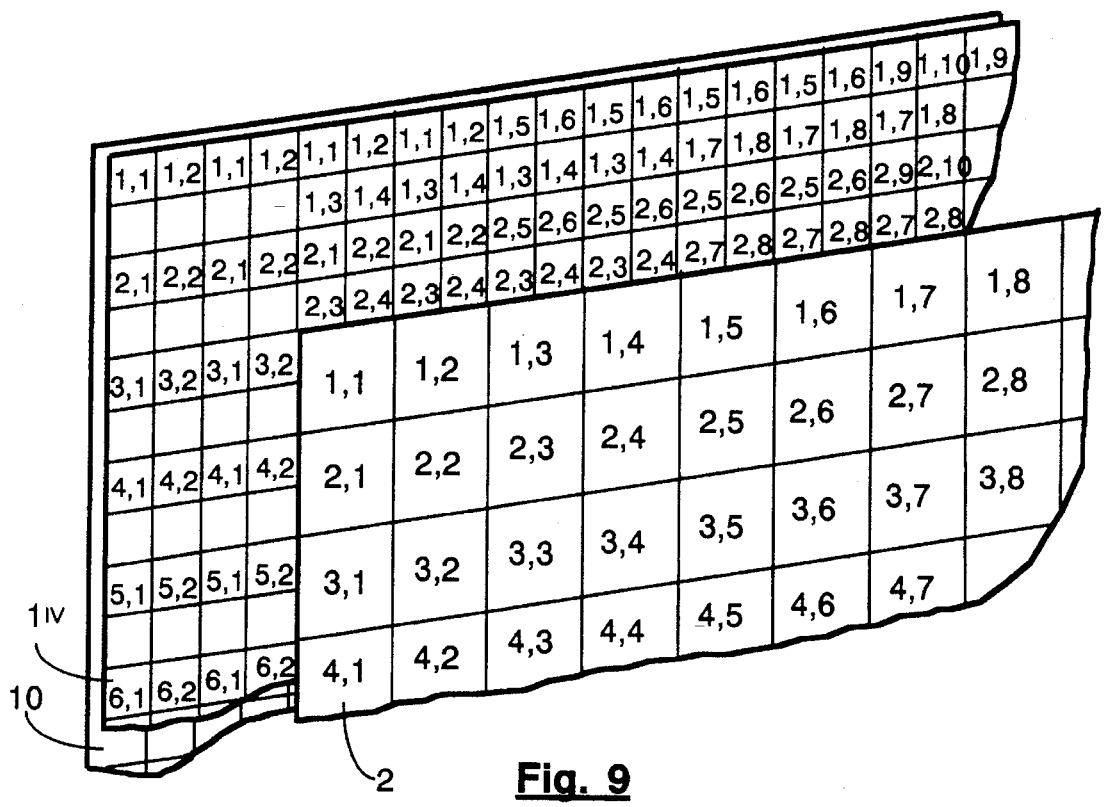
FIG. 9 is an off-axis close-up view of a fifth embodiment of the present invention wherein the viewing zones are interlaced with respect to columns.

FIG. 9 shows another embodiment that is identical to the embodiment shown in FIG. 8, except that the multiplexing pattern on multiplexer HOE $1^{IV}$ is slightly modified to be view-interlaced with respect to the columns (as opposed to the rows) of spots projected onto screen HOE $2^{IV}$. As the viewer moves his head laterally, for example, his right eye may see all the even columns of pixels change as he moves between views. If he continues to move in the same direction, his right eye will next see all the odd columns of pixels transition to the next view. If he continues to move still further in the same direction his right eye will then see all the even columns transition to the next view. This occurs because the lateral reconstruction angles of the odd columns of spots projected onto screen HOE $2^{IV}$ are slightly different than the lateral reconstruction angles of the even columns of spots projected onto screen HOE $2^{IV}$.

Figure 10:
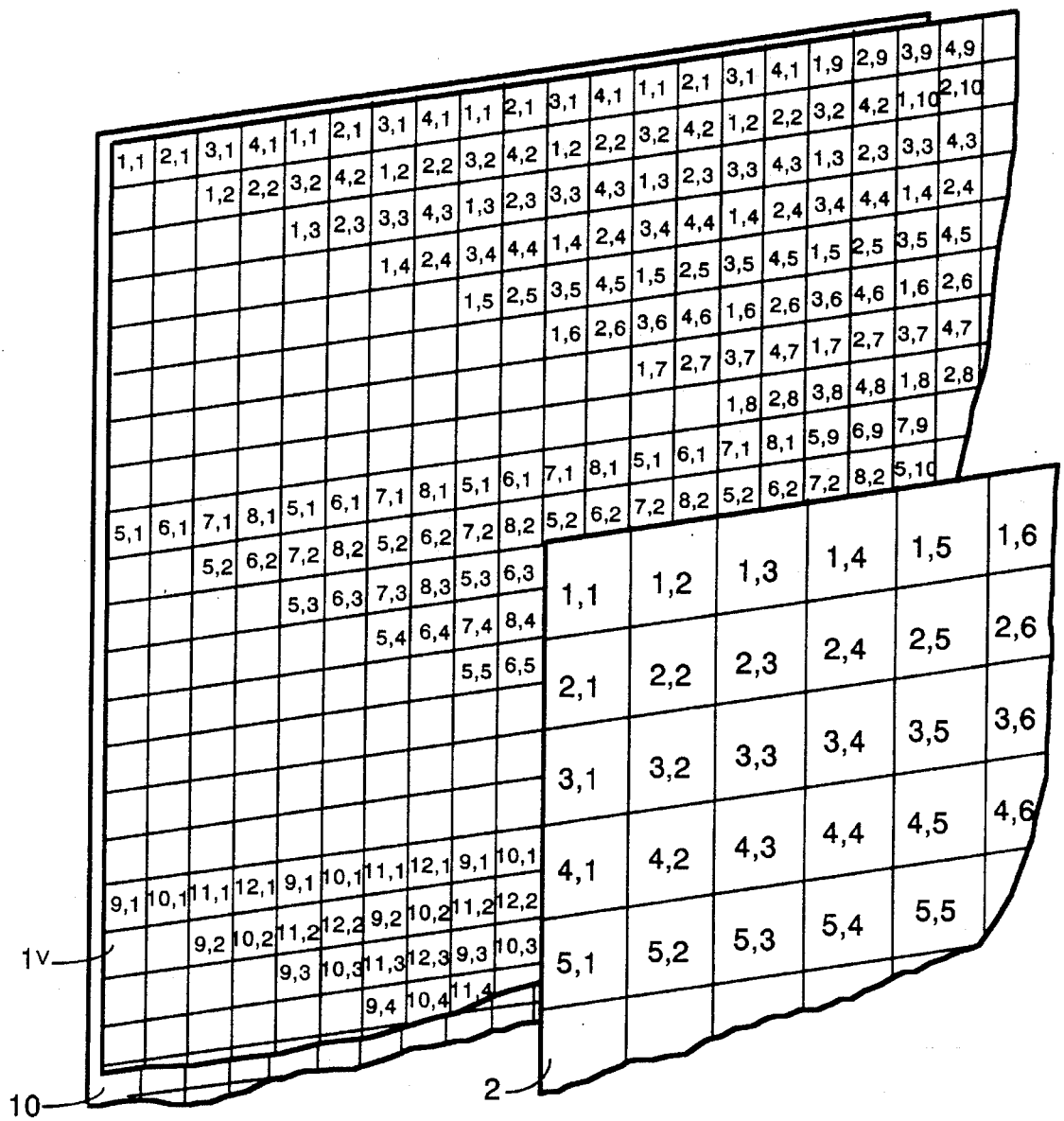
FIG. 10 is an off-axis close-up view of a sixth embodiment of the present invention wherein the viewing zones are interlaced.

FIG. 10 shows another embodiment of the present invention employing another multiplexing scheme. This embodiment uses a multiplexing pattern that further separates the holograms of multiplexer HOE $1^V$ that project a given spot onto screen HOE $2^V$. Hence the lateral reconstruction angles of every spot projected onto screen HOE $2^V$ are increased. The result is that the views presented are further apart than in the previous embodiments. This increases the overall viewing range as compared with the previous embodiments. Another advantage with a multiplexing pattern like this is that the distance between multiplexer HOE $1^V$ and screen HOE $2^V$ can be increased so that the unwanted undiffracted light beams passing through multiplexer HOE $1^V$, such as light beam 24 shown in FIG. 3, are not incident on screen HOE $2^V$ and are not visible to the viewer.

Figure 11:
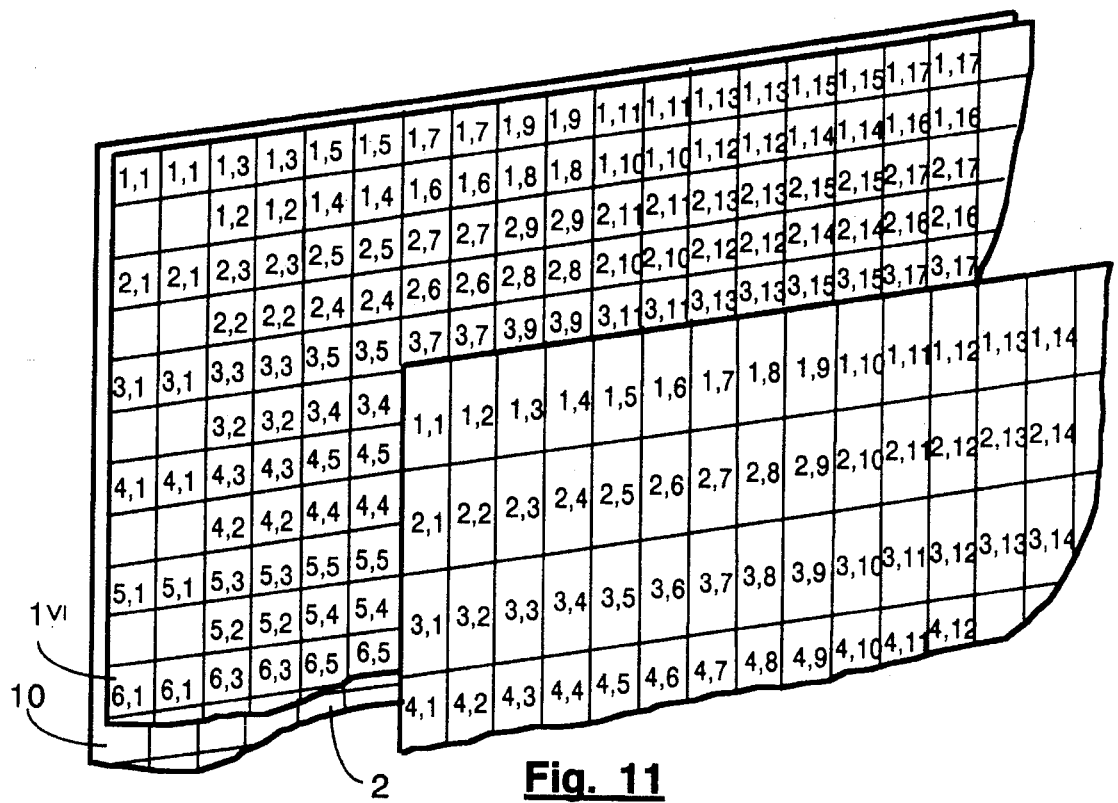
FIG. 11 is an off-axis close-up view of a seventh embodiment of the present invention wherein the aspect ratio of the spots in the raster is one to two.

FIG. 11 shows another embodiment of the present invention. This embodiment creates 2D rasters with spots half as wide as they are tall. Decreasing the spot width allows for smoother transitions between lateral views since, with horizontal parallax, the spots are horizontally offset with each horizontally adjacent viewing zone. Thus as a viewer moves his head laterally between different viewing zones, the spots he sees will move in smaller lateral increments between viewing zones. The spot shape and size is dependant upon and produced by the holograms of multiplexer HOE $1^{VI}$ and the characteristics of the light source reconstructing them. Different spot shapes and aspect ratios can be used to suit different display applications.

Figure 12:
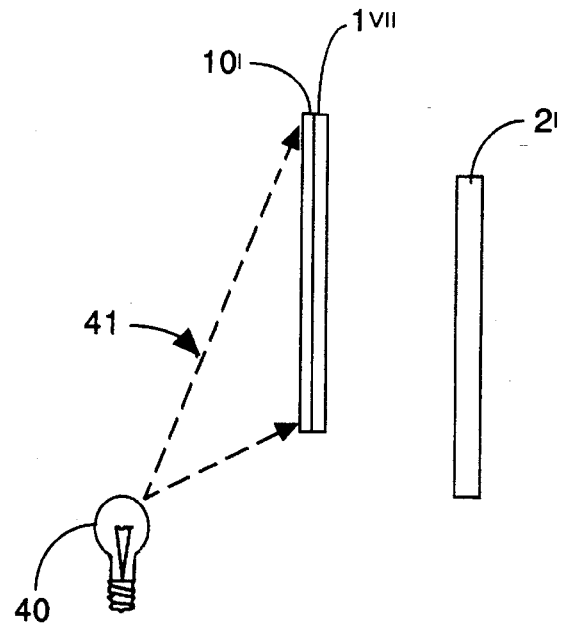
FIG. 12 is a side view of a first full-color embodiment of the present invention using a white light source.
Figure 13:
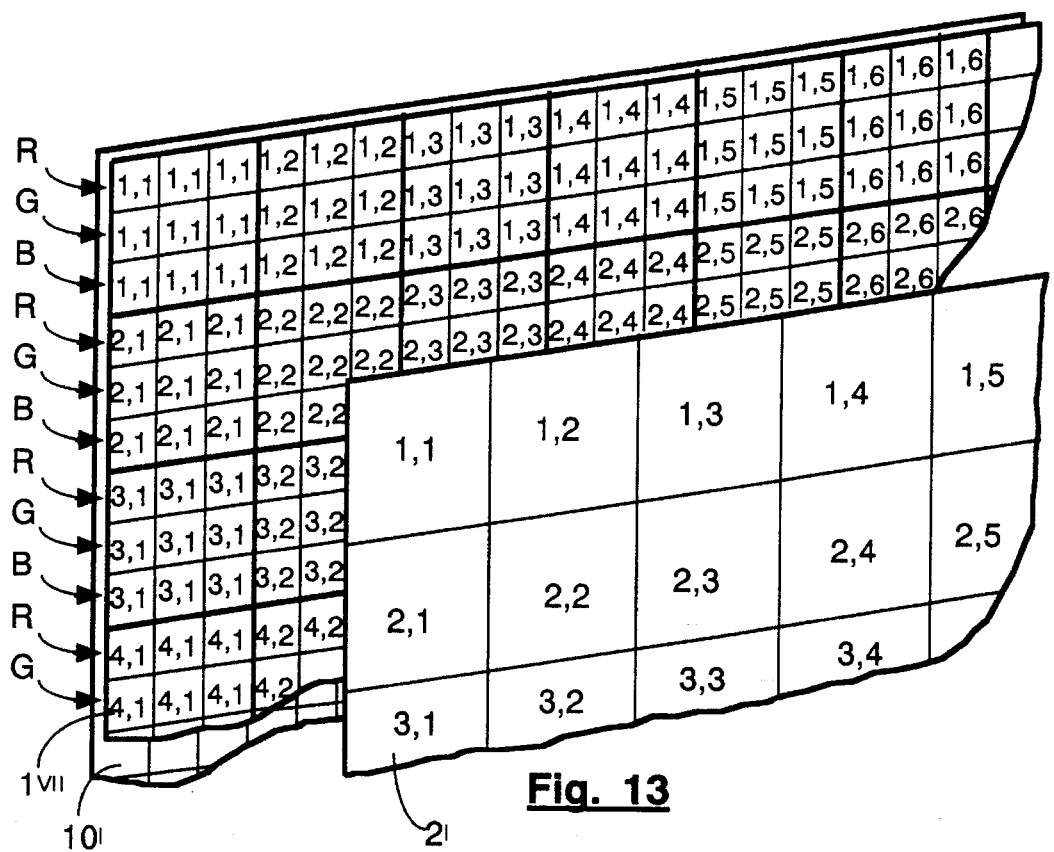
FIG. 13 is an off-axis close-up view of the HOEs of the first full-color embodiment shown in FIG. 12.

Other embodiments of the present invention create full-color 3D images. One such embodiment is shown in FIG. 12. White light source 40 illuminates a color-filtered light valve array such as a conventional full-color LCD panel $10'$. Each pixel in LCD panel $10'$ controls the transmission of one of the three primary colors (red, green, or blue). (Alternatively, the three colors could be produced and divided in a way analogous to the way a color mask in a three electron gun color Cathode Ray Tube (CRT) works, by having three monochromatic light sources of the three primary colors produce diverging reference beams originating from three offset sources and an appropriate mask in front of and parallel to LCD panel $10'$.) A color-corrected or achromatic screen HOE $2^{VII}$ is used for the holographic directional screen. FIG. 13 is a close-up off-axis view of the HOEs used in this embodiment. The multiplexing pattern provides three unique lateral views. Each row of multiplexer HOE $1^{VII}$ is dedicated to be used with either red, green or blue light corresponding to the LCD panel $10'$ pixel behind it as the abbreviations: R, G, B indicate. (Obviously the order and position of the 3 colors may vary.) Each hologram of multiplexer HOE $1^{VII}$ projects a spot onto screen HOE $2^{VII}$ as indicated in FIG. 13. The three primary colors are overlaid on each spot. Since screen HOE $2^{VII}$ is an achromatic hologram, all three colors of light are diffracted by it identically, thus producing a full-color 3D image.

Figure 14:
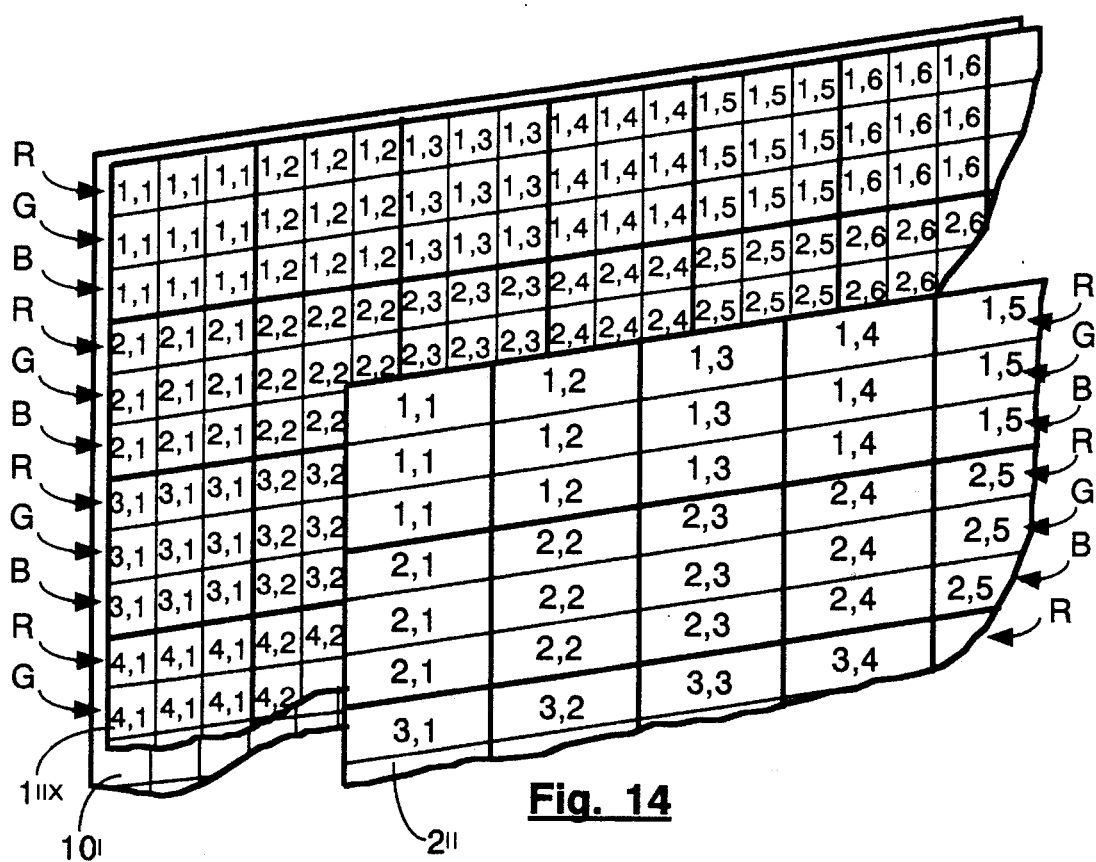
FIG. 14 is an off-axis close-up view of the HOEs of a second full-color embodiment of the present invention.

Another full-color embodiment that does not rely on achromatic holography is illustrated in FIG. 14. This embodiment differs from that of FIG. 13 in two ways. First, the spots reconstructed by multiplexer HOE $1^{VIII}$ are projected onto screen HOE $2^{VIII}$ as FIG. 14 shows, keeping the three primary colors of light separated. The colors are not overlaid on screen HOE $2^{VIII}$ as in the previous color embodiment. The second difference is that screen HOE $2^{VIII}$ is comprised of holograms dedicated to be used with only one of the three primary colors of light. The top row of screen HOE $2^{VIII}$ diffracts red light only, the second row of screen HOE $2^{VIII}$ diffracts green light only, and the third row of screen HOE $2^{VIII}$ diffracts blue light only as the R, G, B notation on screen HOE $2^{VIII}$ indicates. (The particular order or position of colors may vary.) Thus, even though the individual colors of the spots are segregated on screen HOE $2^{VIII}$, the spots are grouped closely together in three-color triads so that by varying the intensity of each triad element, the viewer perceives any color desired.

Figure 15:
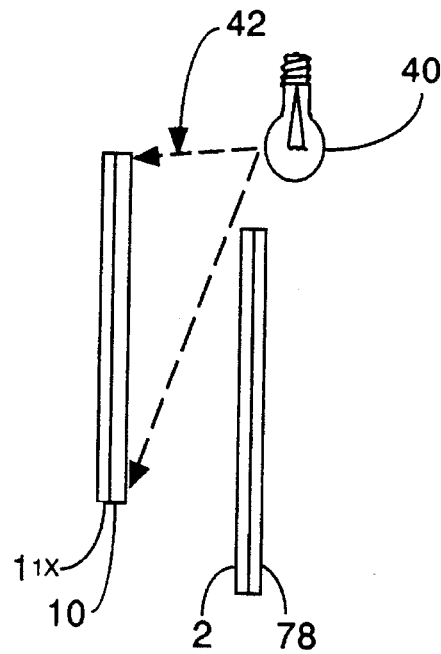
FIG. 15 is a side view of an embodiment of the present invention using reflection holograms on the multiplexer HOE and a white light source.

Other embodiments of the present invention employ reflection holograms for the multiplexer HOE. Referring to FIG. 15, a white point source of light 40 is positioned on the observer's side of multiplexer HOE $1^{IX}$. Light beams 42 from light source 40 are incident on the observer's side of LCD panel 10. Opaque pixels on LCD panel 10 block light, whereas transparent pixels on LCD panel 10 allow light to pass through and be incident on reflection holograms of multiplexer HOE $1^{IX}$. As reflection holograms, these holograms have the ability to efficiently filter out all but the desired color or colors of light, and thus a white light source is ideal. The reconstructed holograms of multiplexer HOE $1^{IX}$ reflect the light back through the transparent pixels of LCD panel 10 to project spots onto screen HOE $2^{IX}$. (Screen HOE $2^{IX}$. can be identical to screen HOE 2 of FIGS. 5a–f if the multiplexing pattern of multiplexer HOE $1^{IX}$ is identical to multiplexer HOE 1 of FIGS. 5a–f.) To avoid multiple images caused by ambient light, an optional slightly tinted dimming filter 78 can be placed immediately next to screen HOE 2. This reduces the brightness of ghost images since external, ambient light needs to pass through filter 78 twice to create unwanted images but light from light source 40 passes through it only once. If all the holograms of multiplexer HOE $1^{IX}$ are the same color, the result is a monochromatic image. Alternatively, each hologram on multiplexer HOE $1^{IX}$ can be one of the three primary colors of light grouped in triads as shown in FIGS. 13 and 14. Using the corresponding screen HOE 2, as described in FIGS. 13 and 14, a full-color image results.

Obviously, any of the previously discussed multiplexing patterns could be employed in the reflection multiplexer HOE embodiment shown in FIG. 15. Additionally light source 40 used in the reflection multiplexer HOE embodiment of FIG. 15 could be external to the display if desired. In this case, dimming filter 78 would not be needed. An external light source could be a room light or sun light for example.

Figure 16:
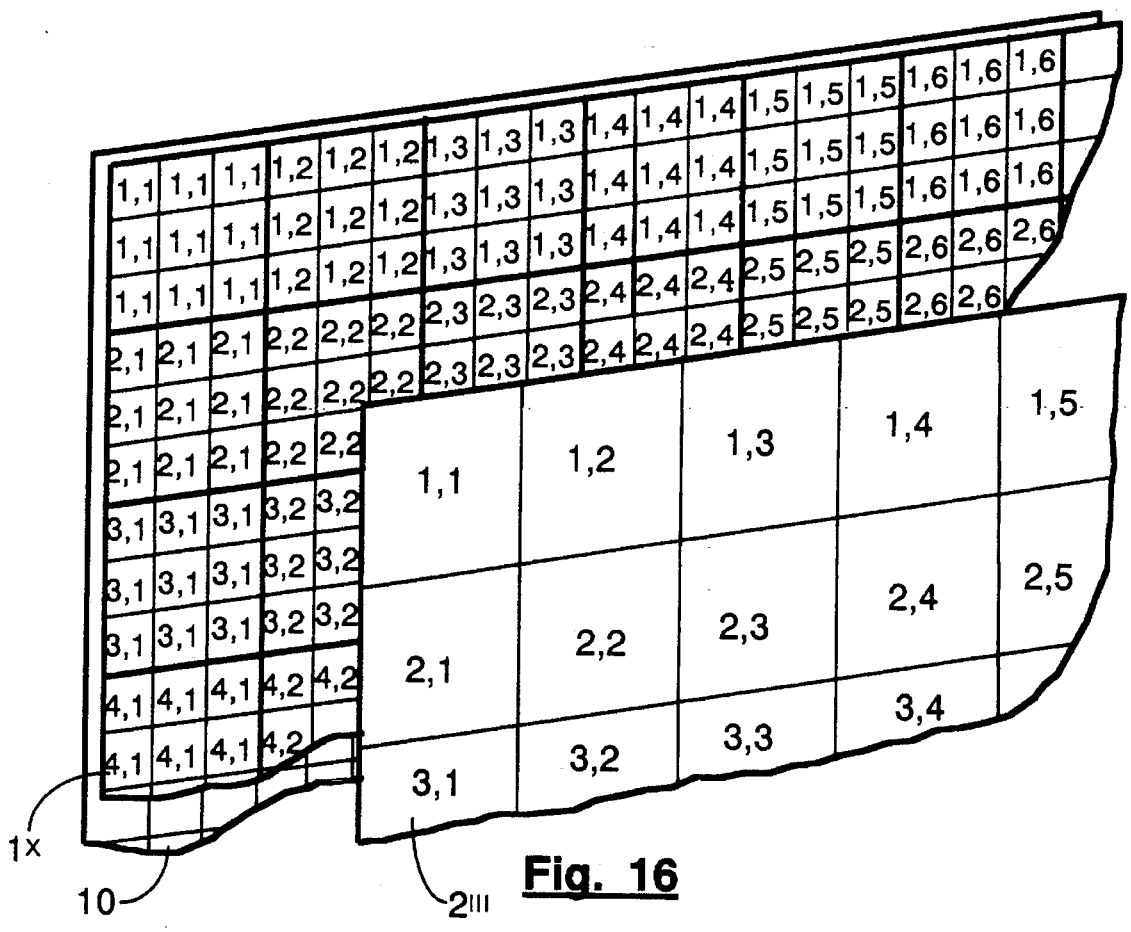
FIG. 16 is an off-axis close-up view of the HOEs of an embodiment of the present invention that presents both horizontal and vertical parallax.

Other embodiments incorporate vertical parallax as well. FIG. 16 is a close-up off-axis view of the HOEs of an embodiment that presents both vertical and horizontal parallax. Again the multiplexing pattern is written on the holograms. (Aside from the HOEs, this embodiment is identical to that shown in FIGS. 3–4.) In this embodiment the holograms comprising screen HOE $2^X$ are holograms of a point image (not a line image). Therefore, light incident on screen HOE $2^X$ is diffused over a small horizontal and vertical angle, and thus each viewing zone has small horizontal and vertical extent. Note also that each spot projected onto screen HOE $2^X$ from multiplexer HOE $1^X$ can be projected from nine different locations in this example. There are three different horizontal angles of projection and three different vertical angles of projection. In this embodiment, unlike previous embodiments, the vertical angle of projection is significant. Since screen HOE $2^X$ reconstructs a point image, the different vertical angles of reconstruction create vertically offset viewing zones and thus vertical parallax. Nine viewing zones are produced in this example.

Figure 17:
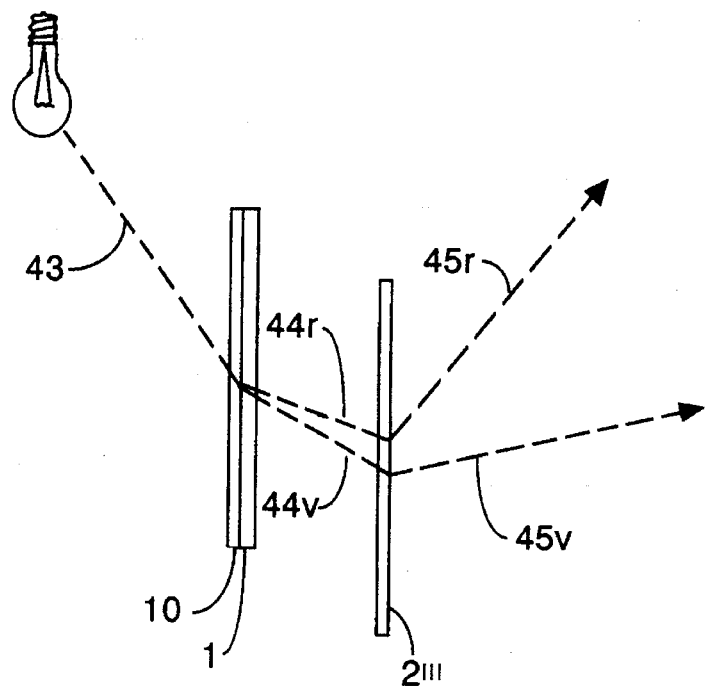
FIG. 17 is a side view of a rainbow hologram embodiment of the present invention.

Another embodiment of the present invention creates the overall look of a rainbow hologram. Rainbow holograms present horizontal parallax only. As a viewer moves vertically, the color of the image changes, but not the perspective. Rainbow holograms are typically very bright because they use every frequency of visible light to create the image. A rainbow hologram embodiment is shown in FIG. 17. White light source 40 produces light beams that are incident on LCD panel 10 (a single light beam, 43, is shown). Multiplexer HOE 1 is positioned immediately adjacent to LCD panel 10 so that the real-time 2D images produced by LCD panel 10 are projected onto multiplexer HOE 1. Multiplexer HOE 1 is the same HOE used in the first discussed embodiment of FIGS. 3–5. Screen HOE $2^{XI}$ is like the screen HOE$2^X$ that was used in the previous vertical parallax embodiment of FIG. 16. The holograms of screen HOE$2^{XI}$ reconstruct a point image. Since neither HOE is an achromatic or color-corrected HOE, different colors of light are diffracted to differing degrees depending on the light beam's wavelength. Red light, for example, is diffracted the most by both HOEs (as illustrated by red beams 44$r$ and 45$r$), and thus the image appears red when viewed from the uppermost viewing angle. Violet light, however, is diffracted the least by both HOEs (as illustrated by violet beams 44$v$ and 45$v$), and thus the image appears violet when viewed from the lower-most viewing angle. Thus the display chromatically separates the image along the vertical axis so that the image changes color as the viewer moves vertically. Since this embodiment uses a white light source such as an ordinary incandescent bulb, it is especially inexpensive.

Figure 18:
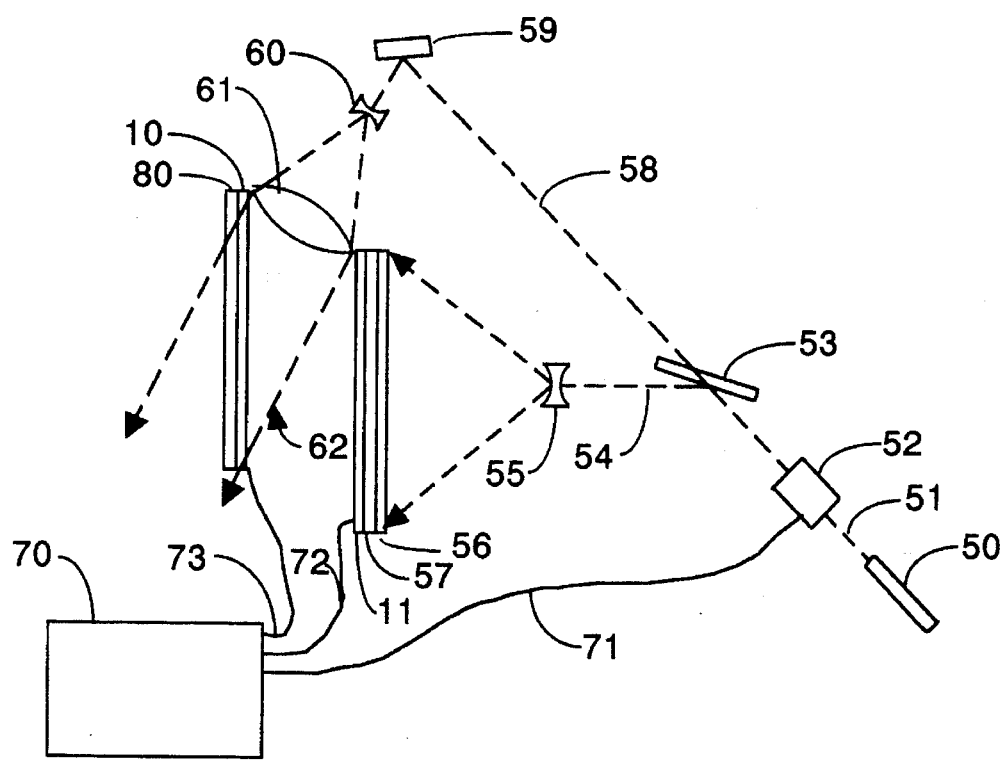
FIG. 18 is a side view of the optical set up used to expose a transmission multiplexer HOE.

FIG. 18 shows one method of making a multiplexer HOE comprised of transmission holograms. A holographic medium 80 becomes a multiplexer HOE after the following process. Holographic medium 80 is affixed to LCD panel 10. (Active matrix LCD panels are ideal for holographic exposures because the movement of individual pixels during exposure of the holographic medium is then totally eliminated.) Another LCD panel 11 is positioned where screen HOE 2 will be positioned relative to the multiplexer HOE in the final display (typically parallel to LCD panel 10, and a few inches away). Laser 50 emits a beam 51 that is incident on electronic shutter 52, that is controlled by computer 70.

When electronic shutter 52 is open, beam 51 is is allowed to pass through electronic shutter 52 and be incident on beam splitter 53, where beam 51 is split into object beam 54 and reference beam 58. Object beam 54, is broadened by lens 55, and then collimated with fresnel lens 56 that is mounted on diffuser 57, which in turn is mounted on LCD panel 11. Thus the broadened beam from lens 55 passes through fresnel lens 56 to be incident on diffuser 57 which in turn illuminates LCD panel 11. The reference beam 58 is reflected off mirror 59 and made to diverge by means of lens 60, and then collimated by lens 61. Then this expanded collimated reference beam 62 is incident on LCD panel 10. (This angle of incidence is 180 degrees opposite the angle of incidence later used to reconstruct the holograms on the multiplexer HOE, as beam 23 in FIG. 3 shows.) Computer 70 controls each pixel on both LCD panels 10 and 11. The exposing of holographic medium 80 can be fully automated by a computer program. For example, to make the first exposure for the multiplexing pattern shown in FIGS. 5a–5f, computer 70 makes all pixels on LCD panel 10 opaque except for the 16 pixels (1,1)–(1,16). Computer 70 also makes all the pixels on LCD 11 opaque except for the 16 pixels that correspond to the location of spot (1,1) on screen HOE 2 in the final display. Then computer 70 opens shutter 52 for a specified length of time to expose the first 16 holograms on holographic medium 80. Shutter 52 is then closed, and then the pixels on each LCD panel 10 and 11 are updated to prepare for the next exposure according to the multiplexing pattern. This method allows 16 holograms to be exposed simultaneously. However, if desired, they could have been exposed individually. (It makes no difference if they are exposed as 16 individual holograms or as one long hologram. In fact, the entire multiplexer HOE could be a single Computer Generated Hologram (CGH) if desired. However, herein each section of the holographic medium that is under the control of a single pixel of LCD panel 10 is considered as an individual hologram.) Holographic medium 80 can remain adhered to LCD panel 10 during and after developing so that alignment of the multiplexer HOE with LCD panel 10 is perfect when the LCD 10 and multiplexer HOE unit is mounted in the final display as shown in FIGS. 3 and 4. Or, if desired, holographic medium 80 may be removed from LCD panel 10 and then developed. In this case, a master multiplexer HOE can be made and then easily replicated.

Figure 19:
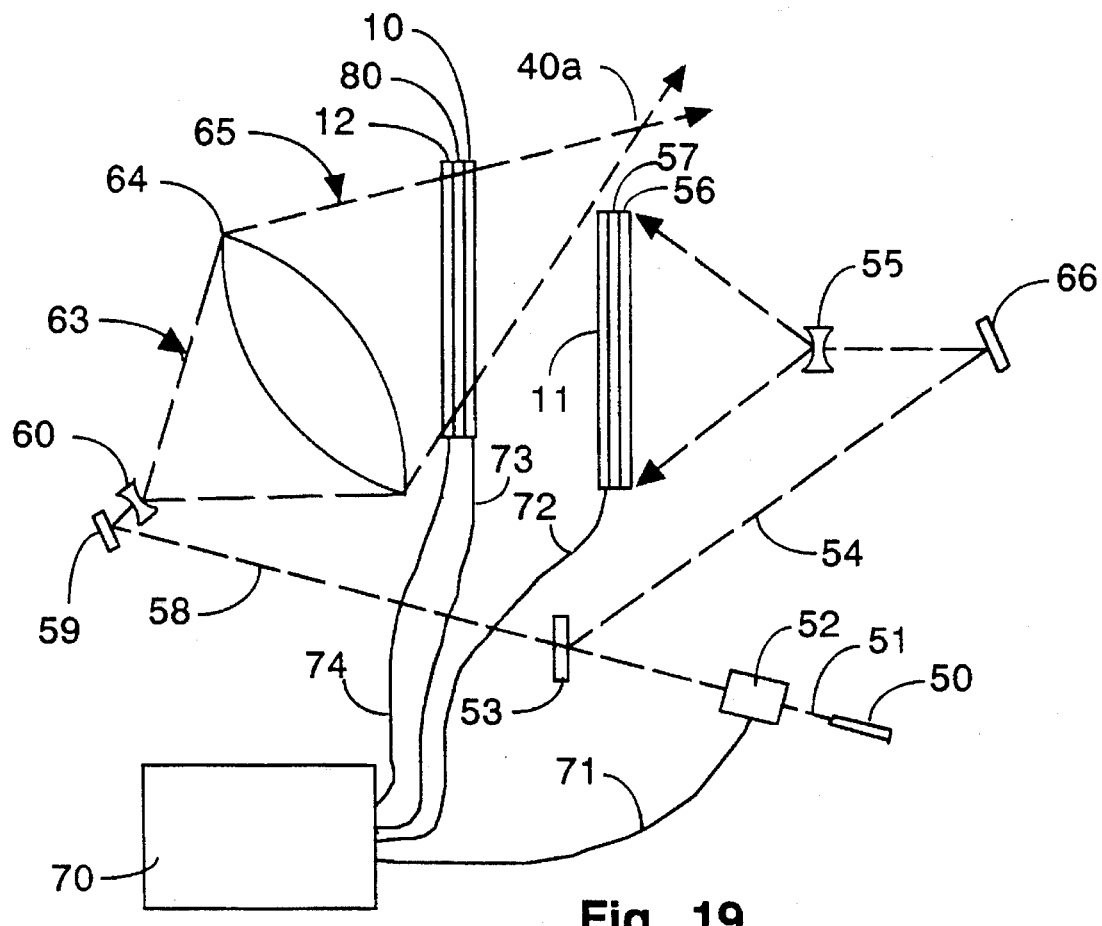
FIG. 19 is a side view of the optical set up used to expose a reflection multiplexer HOE.

Similarly, FIG. 19 depicts an optical setup that can be used to make a multiplexer HOE comprised of reflection holograms. As discussed above, laser 50 emits beam 51 that is incident on electronic shutter 52 that is controlled by computer 70. When electric shutter 52 is open, beam 51 is allowed to pass through electric shutter 52 to be incident on beam splitter 53, where beam 51 is split into object beam 54 and reference beam 58. Object beam 54 reflects off of mirror 56, is then broadened by lens 55, and then collimated with fresnel lens 56 that is mounted on diffuser 57, which in turn is mounted on LCD panel 11. Thus the broadened beam from lens 55 passes through lens 56 to be incident on diffuser 57 which in turn illuminates LCD panel 11. Reference beam 58 is reflected off mirror 59 and made to diverge by lens 60, and then converge as beam 65 by lens 64. The focal point of converging beam 65 is 40a, which is exactly where white light source 40 is located relative to the multiplexer HOE in the final display (see FIG. 15). Intermediate lens 64 and focal point 40a is holographic medium 80. (Holographic medium 80 becomes multiplexer HOE $1^{IX}$ after exposure and developing.) Holographic medium 80 is sandwiched between two LCD panels, 10 and 12, and is also positioned in relation to LCD panel 11 as it will be relative to screen HOE 2 in the final display geometry (see FIG. 15). Computer 70 controls every pixel on LCD panels 10, 11 and 12. Again, exposing of holographic medium 80 is fully automated by computer 70. The pixels on LCD panels 10 and 12 are switched in unison. To expose holographic medium 80 with the multiplexing pattern depicted in FIG. 7, for example, the first exposure is executed as follows. Computer 70 makes all pixels on LCD panels 10 and 12 opaque except for the 4 pixels (1,1)–(1,4), and computer 70 also makes all the pixels on LCD 11 opaque except for the 4 pixels that correspond to spot (1,1) on screen HOE 2 in the final display. Then computer 70 opens shutter 52 for a specified length of time and thus exposes the first 4 holograms. Shutter 52 is then closed, and then the pixels on each LCD panel 10, 11, and 12 are updated to prepare for the next exposure according to the multiplexing pattern. Again, holographic medium 80 can be developed alone, or remain affixed to LCD panel 10 to ensure perfect alignment.

Figure 20:
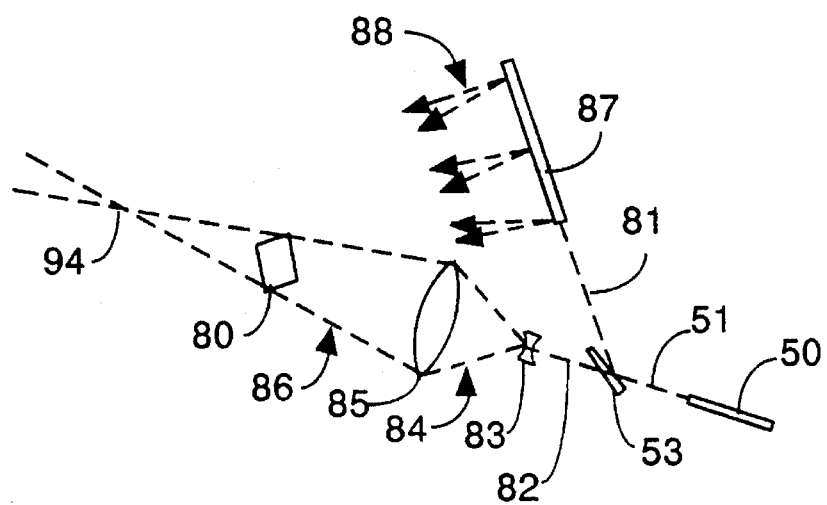
FIG. 20 is a side view of the optical set up used to expose a directional screen HOE hologram for use with the horizontal parallax embodiments.

FIG. 20 depicts an optical setup that makes a hologram for the horizontal-parallax-only screen HOEs. Laser 50 emits beam 51 that is split into two separate beams, object beam 81 and reference beam 82, by beam splitter 53. Object beam 81 is made to diverge by concave lens 83 as beams 84. Beams 84 are incident on convex lens 85 which then focuses the beams 86 to point 94. Intermediate lens 85 and point 94 is the unexposed holographic medium 80 which becomes a hologram of screen HOE 2 after developing. (Alternatively, lens 85 can be replaced with optics which horizontally converge and vertically collimate beams 86 so that there is no vertical discontinuity in a 2D array of these holograms.) Object beam 81 enters a clear plastic rod 87 whose surface has been roughed up so as to diffuse light along the entire length of the rod as beams 88. This rod is the line image that holographic medium 80 will eventually reconstruct. After the exposure is made and holographic medium 80 is developed, the hologram of the line image can be reconstructed by illuminating it with a reference beam diverging from the same angle and position relative to the hologram as point 94 had relative to holographic medium 80 during exposure. In the final display, the hologram is positioned so that the reference origination point is on the multiplexer HOE. Many of these holograms can be made side by side on a single piece of holographic medium so that screen HOE 2 is comprised of hundreds of these holographic exposures.

Thus the screen HOE 2 can be simply an array of transmission holograms of the same real vertical line image. Preferably the line image is parallel to the holograms. The height of the line image determines the vertical extent of the viewing zones, whereas the width of the line image determines the lateral extent of the viewing zones. To produce relatively smooth incremental transitions between views as a viewer moves his head, the lateral extent of each viewing zone must be small. Typically, the light beams forming each viewing zone would diverge at a rate of one degree or less. But some automultiscopic display applications may prefer beam divergence to be greater than one degree, such as five degrees or more. Obviously the amount of beam divergence can vary greatly.

Figure 21:
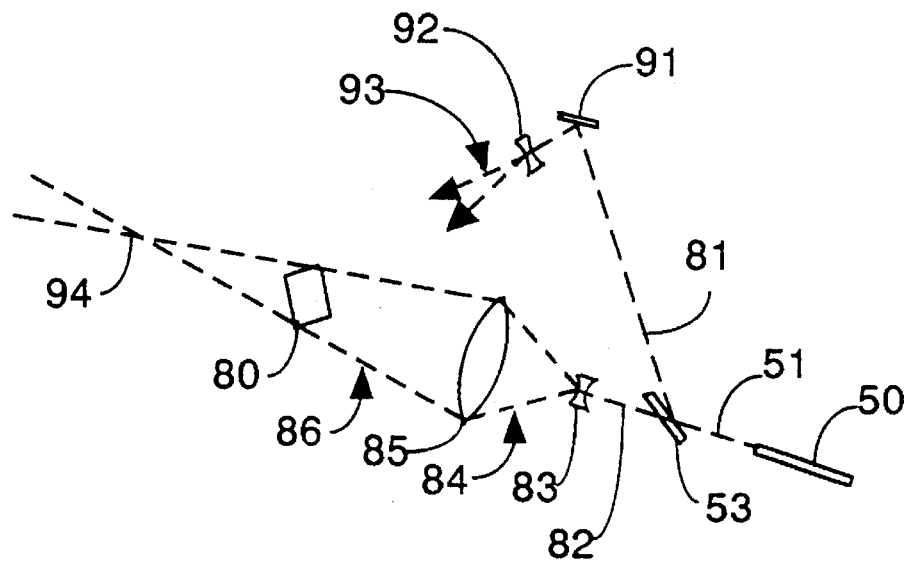
FIG. 21 is a side view of the optical set up used to expose a directional screen HOE hologram for use with either the horizontal and vertical parallax embodiment or the rainbow hologram embodiment.

If each hologram of screen HOE 2 reconstructs N parallel line images (where N is a whole number) then the display will present N viewing ranges with each range consisting of several viewing zones of the image. In other words, as the viewer moves laterally for a certain distance, he will pass through all of the viewing zones the display presents (range 1). If the viewer continues to move laterally in the same direction, the viewing zones are then repeated in this laterally offset area so that he passes through the same series of viewing zones again (range 2). The number of viewing ranges presented and the distance between viewing ranges presented by the display depends on the number of line images and the distance between the line images during the recording of the holograms of screen HOE 2. Displaying multiple viewing ranges is advantageous to allow for more simultaneous viewers with no increase in data requirements. For the vertical parallax and rainbow hologram embodiments of FIGS. 16 and 17, the screen HOE must limit both the vertical and horizontal diffusion of light. Therefore a hologram of a point image is made. (Just as a hologram of a vertical line image limits the horizontal diffusion of light, so a hologram of a point image limits both the horizontal and vertical diffusion of light.) An optical setup that makes such a screen HOE is shown in FIG. 21. This Figure is identical to FIG. 20 in all respects except that object beam 81 reflects off of mirror 91 and is made to diverge by concave lens 92 as beams 93. As with the multiple line image screen HOE described above, this screen HOE could be a hologram of multiple point images to create several repeated viewing ranges. This allows for more simultaneous viewers, and more freedom of movement while viewing the display.

Figure 22:
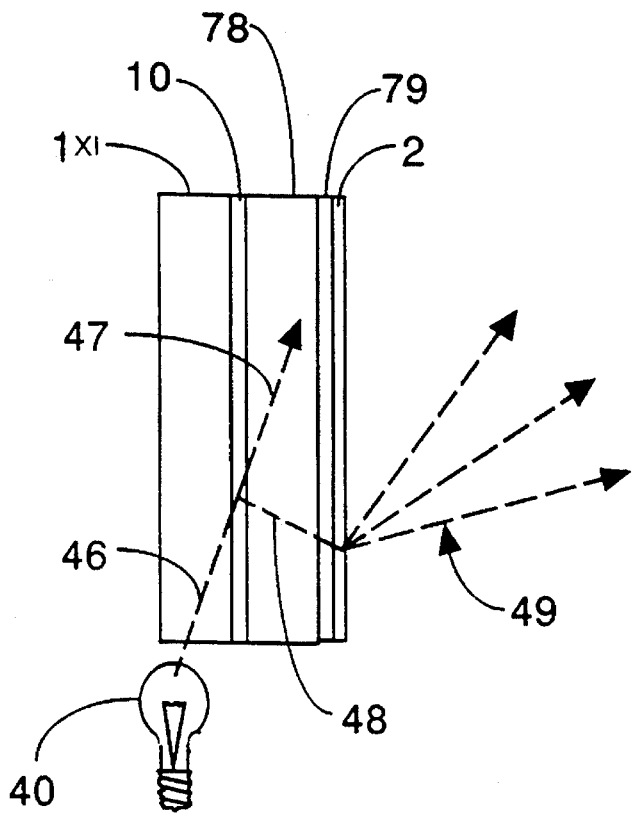
FIG. 22 is a side view of an embodiment of the present invention using an edge-illuminated multiplexer HOE and an optical flat.

Another embodiment of the present invention uses a white light edge-illuminated HOE for multiplexer HOE $1^{XI}$ as FIG. 22 depicts. This embodiment allows the display to be more compact and more nearly a flat panel display. Light emanating from white light source 40, travels through the edge of multiplexer HOE $1^{XI}$ to reconstruct its holograms. LCD panel 10 is affixed to multiplexer HOE $1^{XI}$ so as to selectively block the reconstructed beams. In FIG. 22, light beam 46 is shown reconstructing a hologram on multiplexer HOE $1^{XI}$. A transparent pixel on LCD panel 10 allows the resulting light to pass through it. Diffracted light beam 48 travels through optical flat 78 to be incident on microlouver filter 79. (3M Corp. makes microlouver filters with louvers of various angles.) The microlouvers are angled so as to allow beam 48 to pass through microlouver filter 79 and be incident on screen HOE 2. However, all the light beams that pass through LCD 10 without being diffracted by multiplexer HOE $1^{XI}$, such as beam 47, are blocked by microlouver filter 79, and thus do not interfere with the desired image. In this embodiment the entire display is one solid unit, and therefore the individual elements are always kept in perfect alignment.

Other embodiments of the present invention use alternative 2D image projectors such as cathode ray tube projection systems or LCD projectors that use a lens to focus the 2D image onto multiplexer HOE 1. Other embodiments place LCD panel 10, or other light valve array or spatial light modulator, on the other side of the multiplexer HOE 1, so as to be between both HOEs. In this case, the light valve array controls the intensity of the reconstructed beams instead of the reference beams of the holograms on multiplexer HOE 1. Other preferred embodiments have the diffraction gratings or holograms of multiplexer HOE 1 built right into LCD panel 10, the light valve array, or some other 2D image generator. Obviously, the many individual features described in each particular embodiment of the present invention can occur in numerous combinations.

The scope of the present invention should not be determined by the scope of the embodiments introduced here, but by the appended claims and their legal equivalents.

What is claimed is:

1. A real-time electronic automultiscopic imaging system to present three-dimensional images with lateral parallax, said system comprising:

a screen HOE comprising a lateral array of holograms wherein each hologram, when reconstructed, produces one or more line images;

a multiplexer HOE comprising a two-dimensional array of holograms, wherein each said hologram when reconstructed produces a spot on said screen HOE, the sum of all spots produced by all said holograms of said multiplexer HOE forming a two-dimensional array of spots on said screen HOE, and wherein each said spot produced by said holograms of said multiplexer HOE is produced by at least two laterally offset holograms or portions of holograms of said multiplexer HOE; and a real-time two-dimensional image projector to project two-dimensional images onto said multiplexer HOE whereby real-time variable combinations of said holograms, or portions of said holograms, of said multiplexer HOE are selectively reconstructed and thereby produce a real-time variable pattern of spots on said screen HOE.

2. A real-time electronic automultiscopic imaging system as in claim 1 wherein said screen HOE and said multiplexer HOE are oriented with their surfaces substantially parallel, and wherein said screen HOE is intermediate said multiplexer HOE and at least one said line image produced by said screen HOE.

3. A real-time electronic automultiscopic imaging system as in claim 1 wherein both said screen HOE and said multiplexer HOE are comprised of transmission holograms.

4. A real-time electronic automultiscopic imaging system as in claim 1 wherein said multiplexer HOE is comprised of one or more reflection holograms.

5. A real-time electronic automultiscopic imaging system as in claim 1 wherein every said hologram of said screen HOE when reconstructed produces a said line image that intersects with a said line image produced from every other hologram in said lateral array.

6. A real-time electronic visual display to present three-dimensional images by binocular parallax comprising:

a first HOE that, when reconstructed in whole or in part, produces one or more line images;

a second HOE comprising a two-dimensional array of holograms, each hologram when reconstructed projecting a spot onto said first HOE, and wherein the total of all spots projected by said holograms of said second HOE forms a two-dimensional raster of spots on said first HOE;

a two-dimensional array of individually switchable light valves to control the brightness of either the reconstruction beams or the resulting object beams of each said hologram or portions thereof of said second HOE, and wherein said two-dimensional array of light valves has at least two different laterally offset light valves control the brightness of each said spot projected onto said first HOE; and at least one light source to produce light incident on either said second HOE or said two-dimensional array of individually switchable light valves.

7. A real-time electronic visual display as in claim 6 wherein said first HOE and said second HOE are substantially flat and oriented with the surface of one substantially parallel to the surface of the other.

8. A real-time electronic visual display as in claim 6 wherein said two-dimensional array of individually switchable light valves control the brightness of the resulting object beams of each said hologram or portions thereof of said second HOE.

9. A real-time electronic visual display as in claim 6 wherein said line images produced by said first HOE are substantially parallel to each other, and wherein at least one said line image produced by said first HOE is located on the opposite side of said first HOE's surface as the incident reconstruction beams.

10. A real-time electronic visual display as in claim 6 wherein said first HOE is comprised of an array of holograms that are laterally offset and wherein each said hologram, when reconstructed in whole or in part with laterally diverging light, produces one or more line images.

11. A real-time electronic automultiscopic display to present three-dimensional images by means of parallax, said system comprising;

a first holographic optical element comprising an array of laterally offset holograms wherein each said hologram, when entirely or partially reconstructed, diffracts incident light toward one or more laterally limited viewing zones that are also vertically limited to five degrees or less;

a second holographic optical element comprising a two-dimensional array of holograms, wherein each hologram when reconstructed produces a spot on said first holographic optical element, the sum of said spots reconstructed by said holograms of said second holographic optical clement creating a two-dimensional array of spots on said first holographic optical element and wherein each said spot produced by said second holographic optical element is produced by at least two vertically offset holograms of said second holographic optical element so as to produce vertically offset viewing zones whereby vertical parallax is presented; and means for projecting real-time electronically generated two-dimensional images onto said second holographic optical element whereby various combinations of said holograms, or parts of said holograms, are selectively reconstructed and thereby produce a pattern of spots on said first holographic optical element.

12. A real-time electronic visual display to present three-dimensional images by way of parallax, said system comprising;

a directional screen HOE that, when reconstructed in whole or in part, redirects incident light toward one or more laterally limited viewing zones;

a multiplexer HOE comprising a two-dimensional array of holograms wherein each hologram, when reconstructed, projects a spot onto said directional screen HOE, and wherein a complete two-dimensional raster of spots is projected onto said directional screen HOE by the reconstruction of all said holograms of said multiplexer HOE; and a two-dimensional array of individually switchable light valves to individually control the intensity of either the reconstruction beams or resulting object beams of each said hologram or portions of each said hologram of said multiplexer HOE and wherein said light valves are configured so that at least two different laterally offset light valves control the brightness of each said spot projected onto said directional screen HOE.

* * * * *